United States Patent [19]
Horiuchi et al.

[11] Patent Number: 5,612,825
[45] Date of Patent: Mar. 18, 1997

[54] ZOOM LENS

[75] Inventors: Akihisa Horiuchi; Nobuyuki Tochigi, both of Kanagawa-ken, Japan

[73] Assignee: Canon Kabushiki Kaisha, Tokyo, Japan

[21] Appl. No.: 399,513

[22] Filed: Mar. 7, 1995

[30] Foreign Application Priority Data

Mar. 14, 1994 [JP] Japan .................................... 6-070003
Mar. 24, 1994 [JP] Japan .................................... 6-053764

[51] Int. Cl.⁶ .................................................... G02B 15/14
[52] U.S. Cl. .................................................... 359/687
[58] Field of Search .................................... 359/687, 684

[56] References Cited

U.S. PATENT DOCUMENTS

| | | | |
|---|---|---|---|
| 4,802,747 | 2/1989 | Horiuchi | 350/427 |
| 4,842,386 | 6/1989 | Kitagishi et al. | 350/427 |
| 4,854,684 | 8/1989 | Horiuchi | 350/427 |
| 4,859,042 | 8/1989 | Tanaka | 359/684 |
| 4,892,397 | 1/1990 | Horiuchi | 350/425 |
| 5,011,272 | 4/1991 | Nakayama et al. | 350/427 |
| 5,095,387 | 3/1992 | Horiuchi | 359/676 |
| 5,138,492 | 8/1992 | Hamano et al. | 359/684 |
| 5,321,552 | 6/1994 | Horiuchi et ak. | 359/654 |
| 5,353,157 | 10/1994 | Horiuchi | 359/676 |
| 5,430,576 | 7/1995 | Hamano | 359/684 |

FOREIGN PATENT DOCUMENTS

| | | |
|---|---|---|
| 58-160913 | 9/1983 | Japan . |
| 62-247316 | 10/1987 | Japan . |
| 64-24213 | 1/1989 | Japan . |
| 2-55308 | 2/1990 | Japan . |
| 4-26811 | 1/1992 | Japan . |
| 4-43311 | 2/1992 | Japan . |
| 4-88309 | 3/1992 | Japan . |
| 4-153615 | 5/1992 | Japan . |

Primary Examiner—Georgia Y. Epps
Assistant Examiner—Dawn-Marie Bey
Attorney, Agent, or Firm—Fitzpatrick, Cella, Harper & Scinto

[57] ABSTRACT

A zoom lens of the rear focus type is disclosed comprising, from front to rear, a first lens unit of positive refractive power, a second lens unit of negative refractive power, a third lens unit of positive refractive power and a fourth lens unit of positive refractive power, the second and fourth lens units axially moving to effect zooming, and the fourth lens unit axially moving to effect focusing. The third lens unit includes at least one positive lens at a front position and a negative lens of meniscus form concave toward the image side at a rearmost position. The fourth lens unit includes one negative lens and two positive lenses. The focal lengths f3 and f4 of the third and fourth lens units, respectively, satisfy the following condition:

$$0.73 < f3/f4 < 1.00.$$

2 Claims, 18 Drawing Sheets

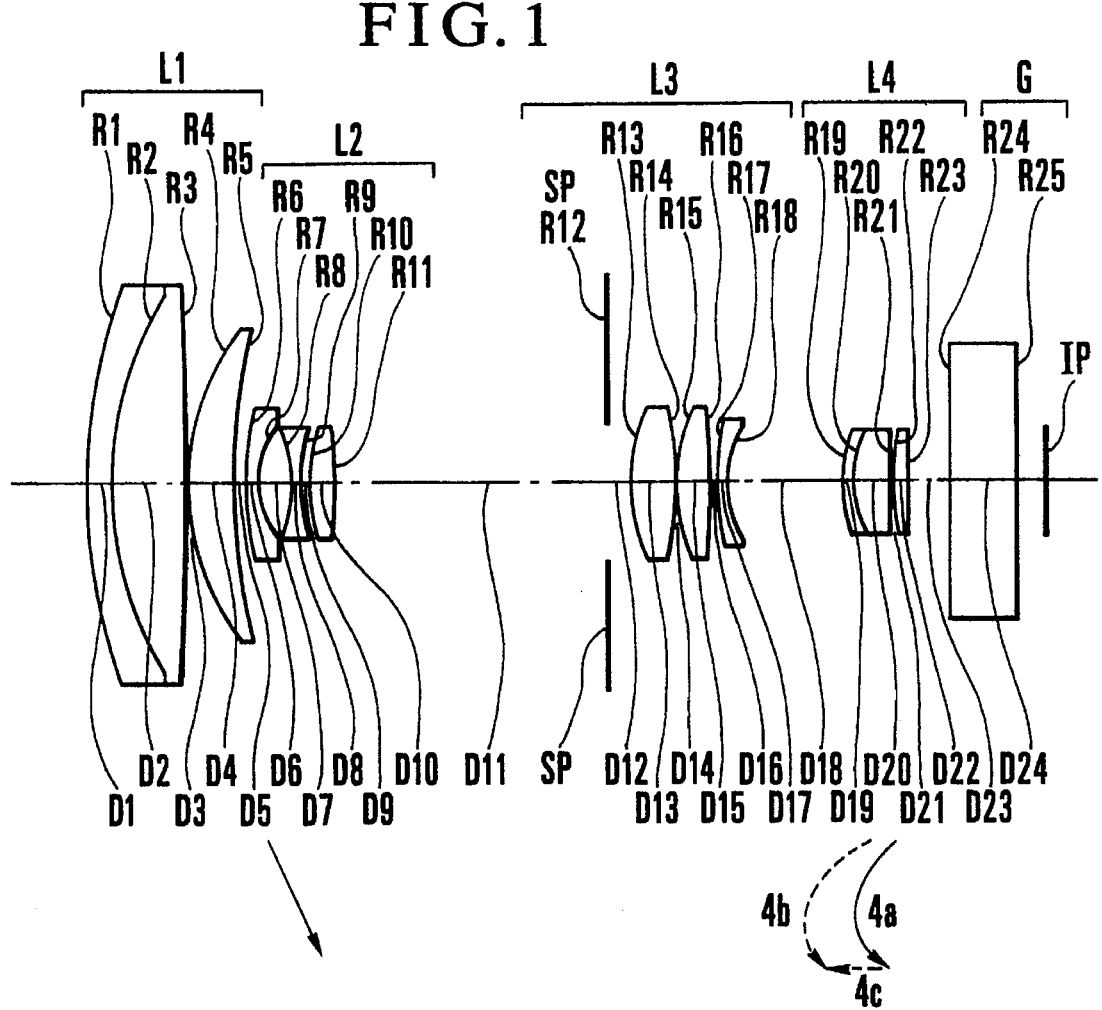
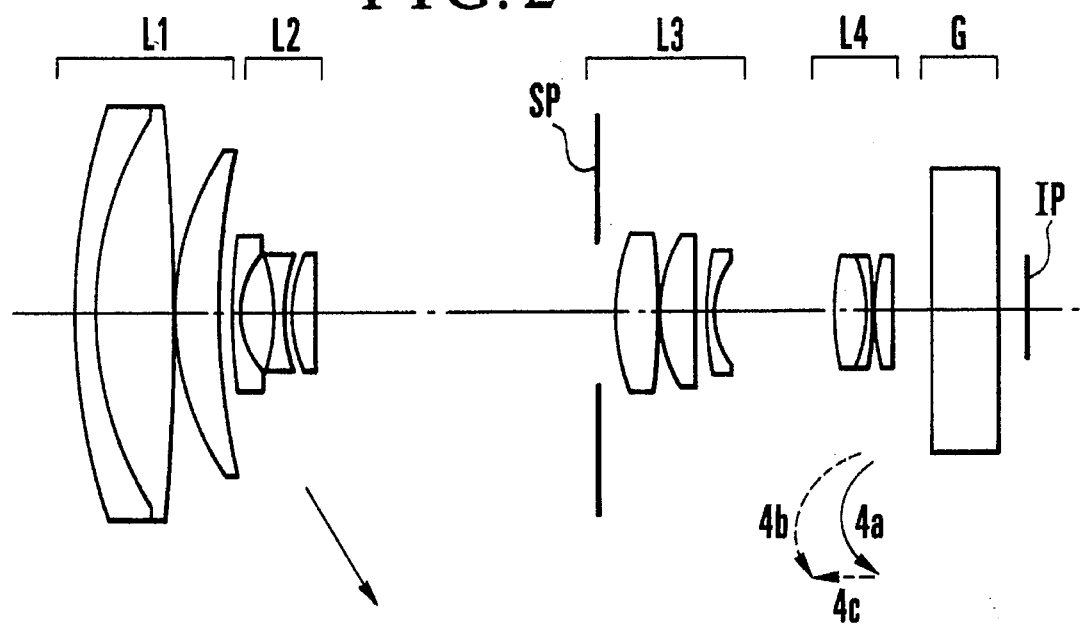

FIG.5(A)(1)
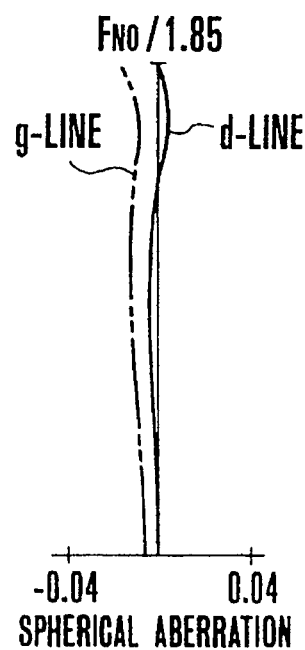
FIG.5(A)(2)
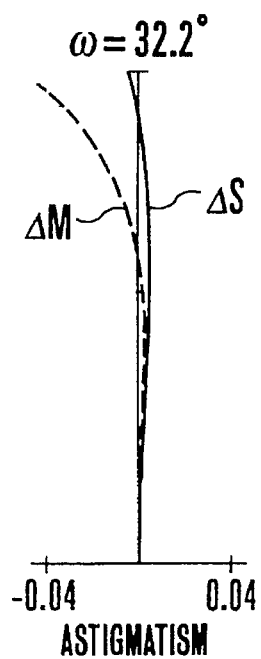
FIG.5(A)(3)
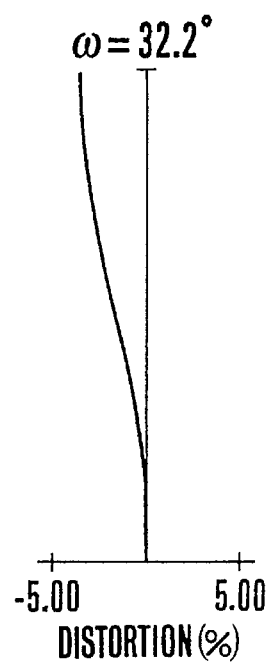
FIG.5(B)(1)
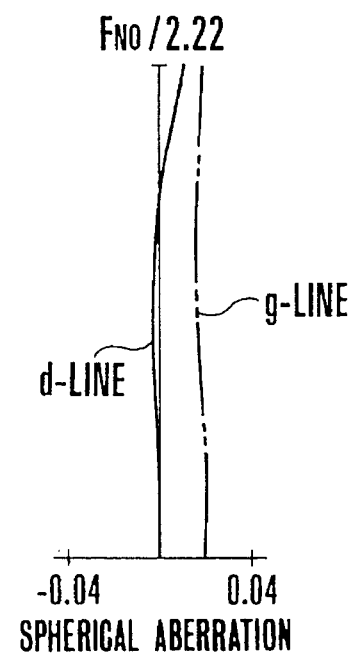
FIG.5(B)(2)
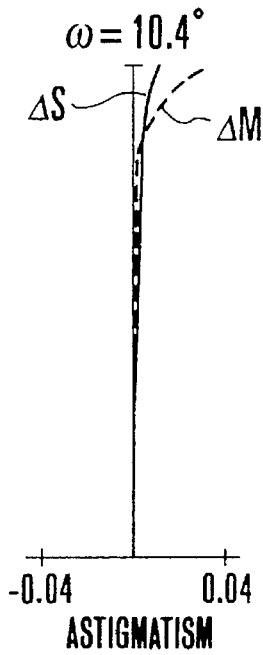
FIG.5(B)(3)
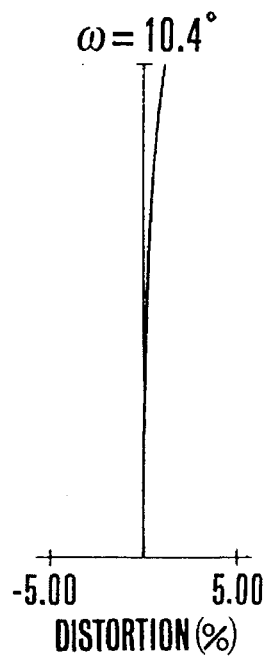

FIG.5(C)(1)
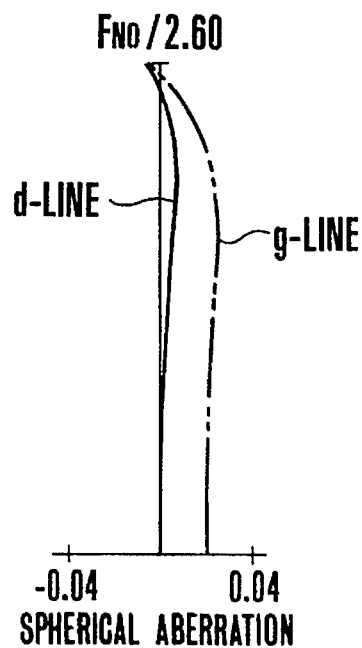
FIG.5(C)(2)
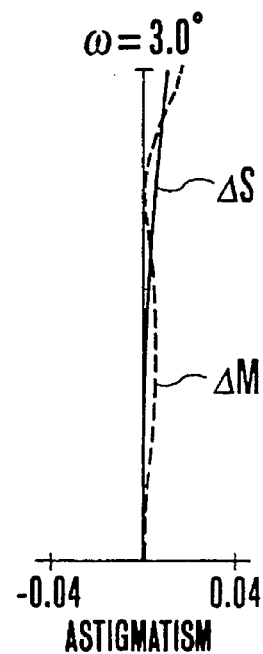
FIG.5(C)(3)
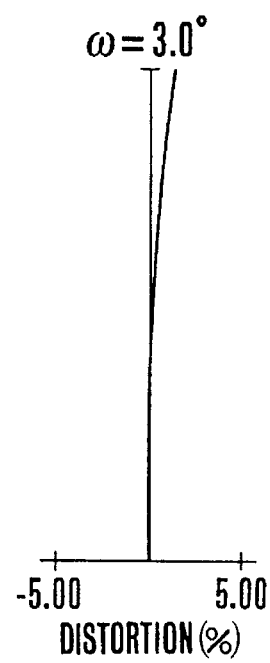
FIG.6(A)(1)
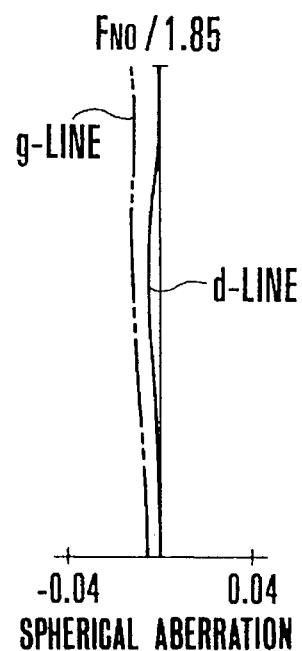
FIG.6(A)(2)
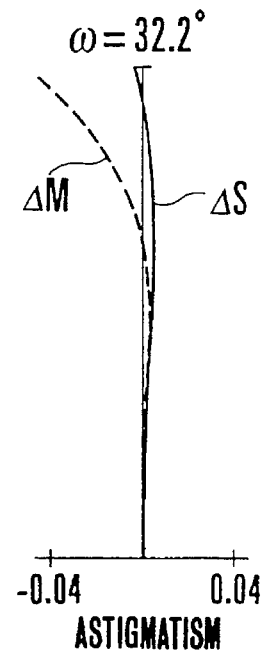
FIG.6(A)(3)
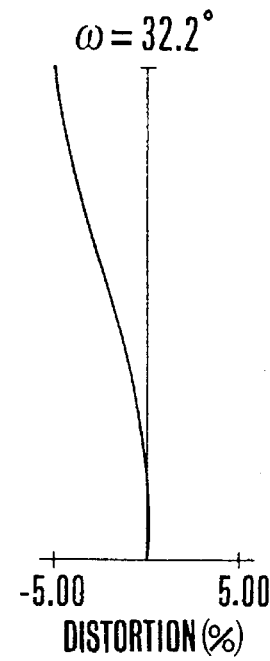

FIG.6(B)(1)
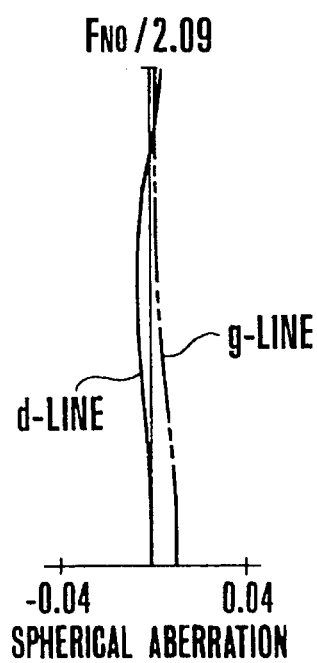
FIG.6(B)(2)
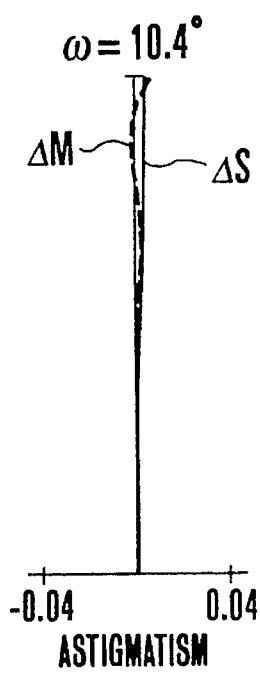
FIG.6(B)(3)
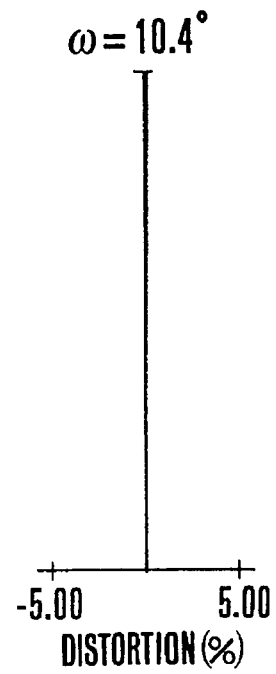
FIG.6(C)(1)
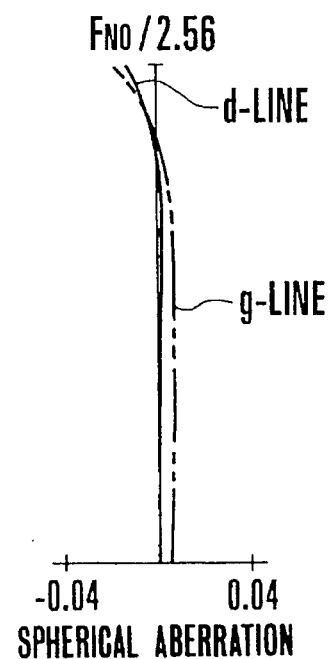
FIG.6(C)(2)
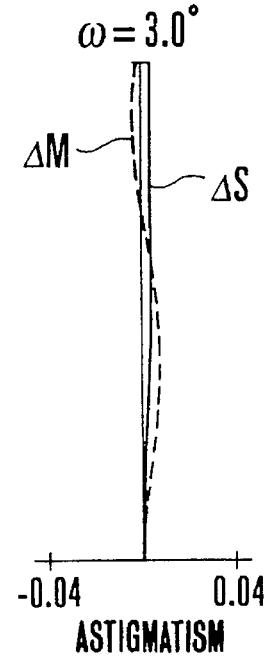
FIG.6(C)(3)
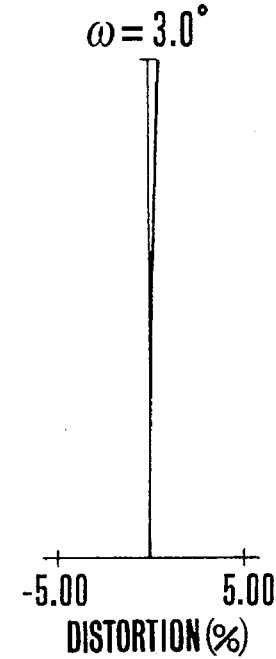

FIG.7(A)(1)  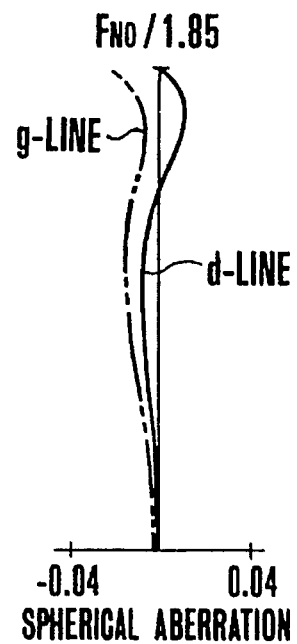
FIG.7(A)(2)  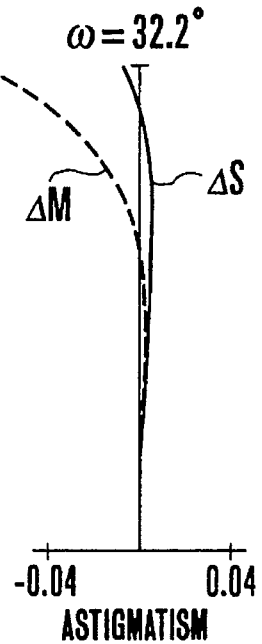
FIG.7(A)(3)  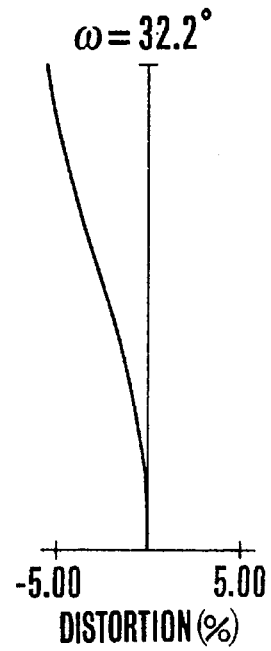
FIG.7(B)(1)  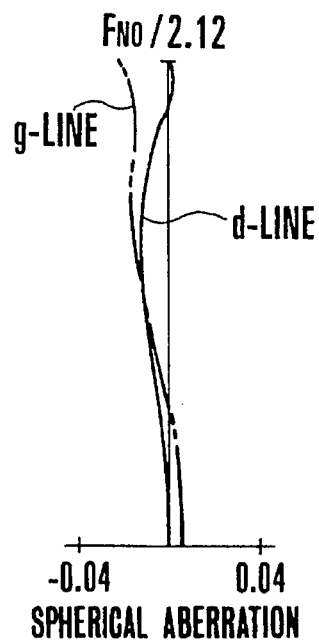
FIG.7(B)(2)  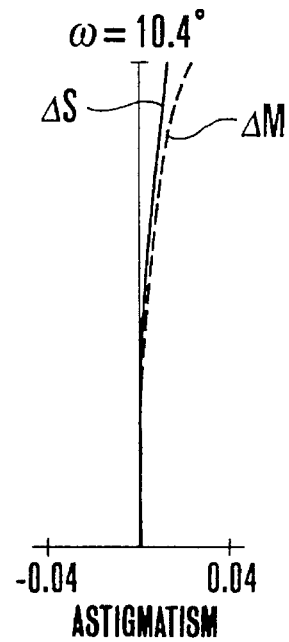
FIG.7(B)(3)  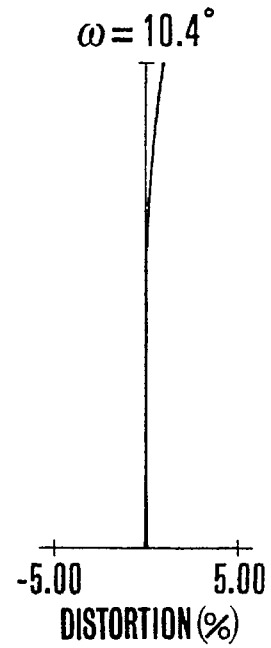

FIG.7(C)(1)
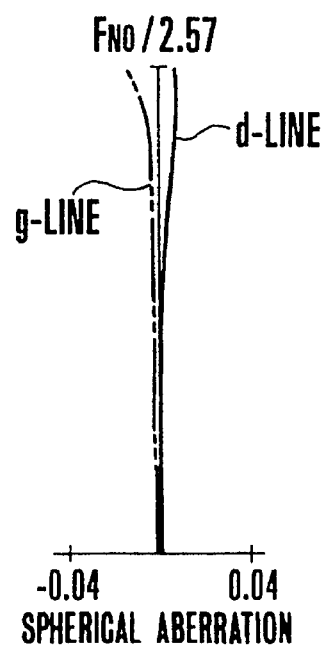
FIG.7(C)(2)
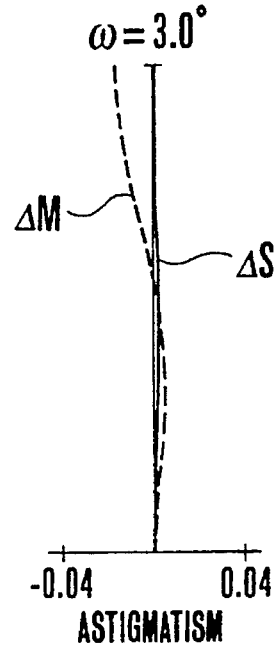
FIG.7(C)(3)
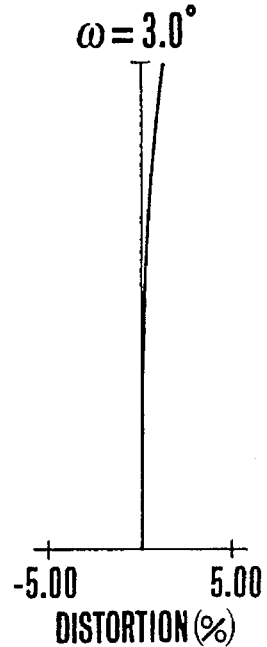
FIG.8(A)(1)
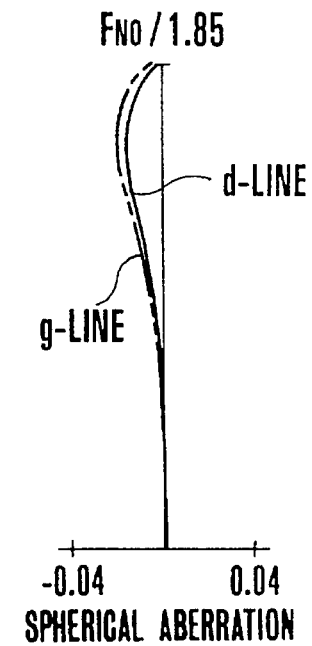
FIG.8(A)(2)
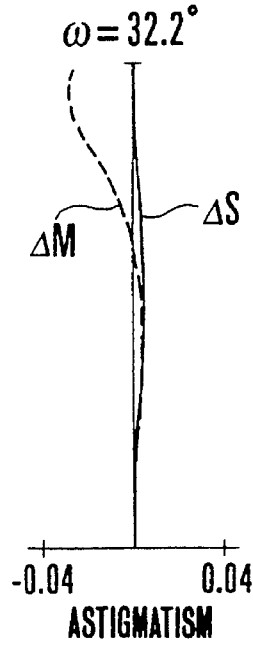
FIG.8(A)(3)
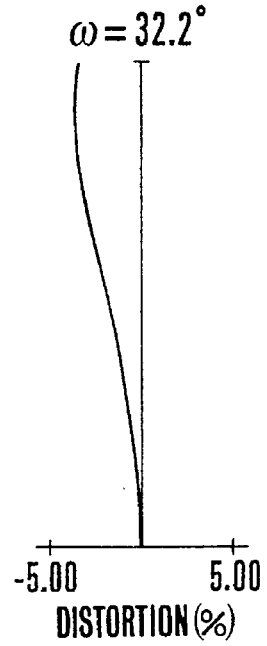

FIG.8(B)(1)
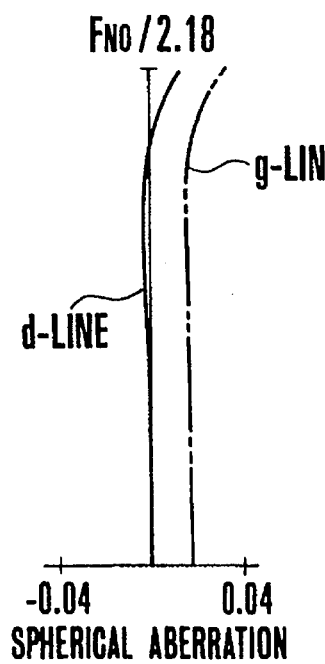
FIG.8(B)(2)
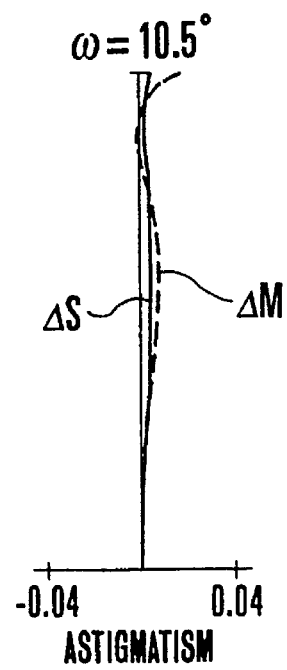
FIG.8(B)(3)
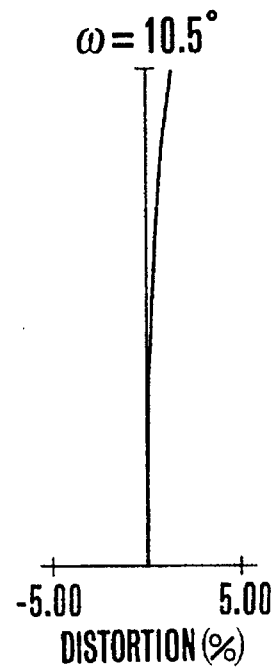
FIG.8(C)(1)
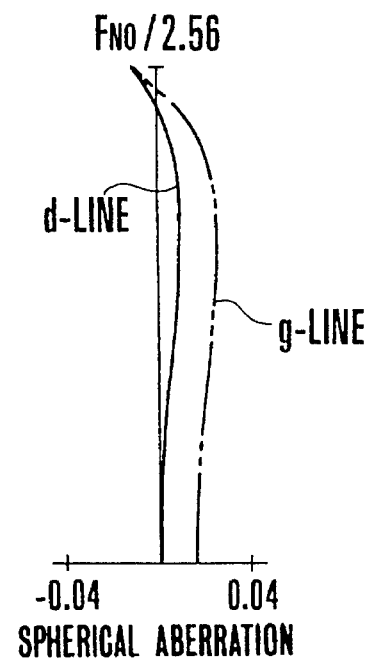
FIG.8(C)(2)
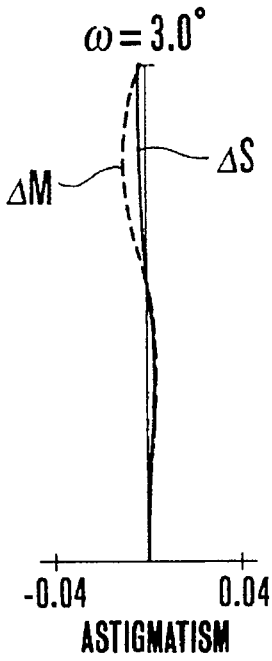
FIG.8(C)(3)
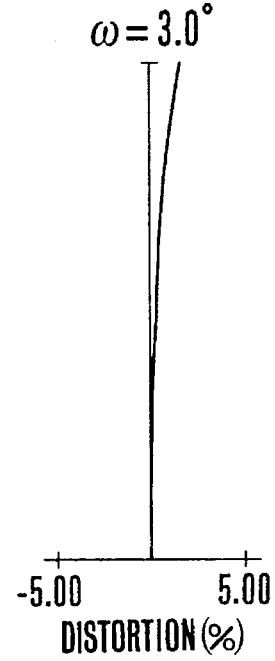

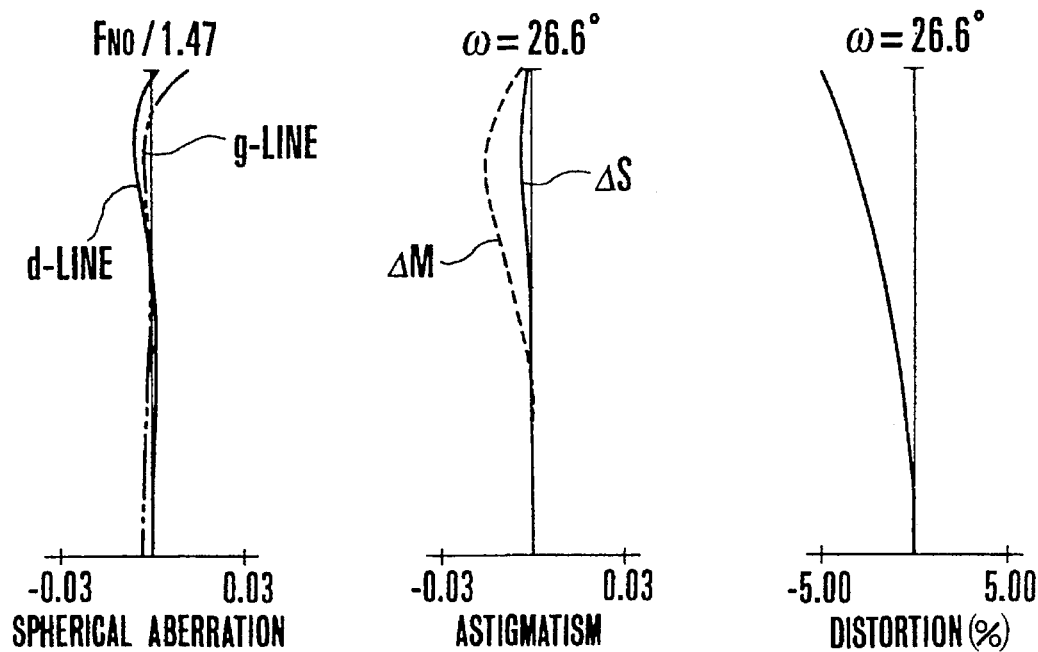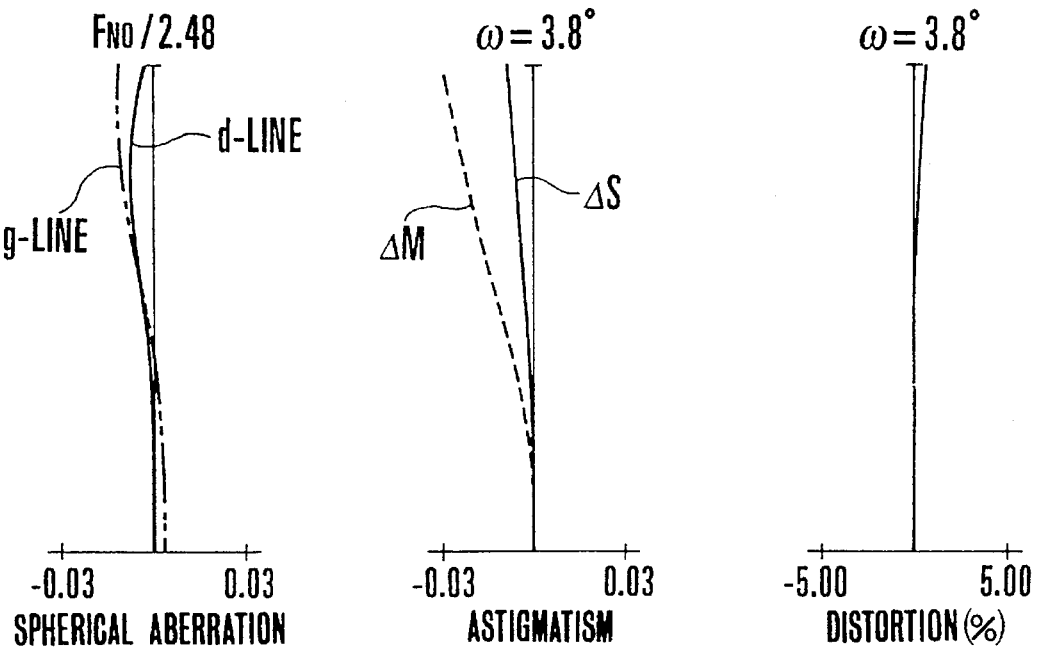

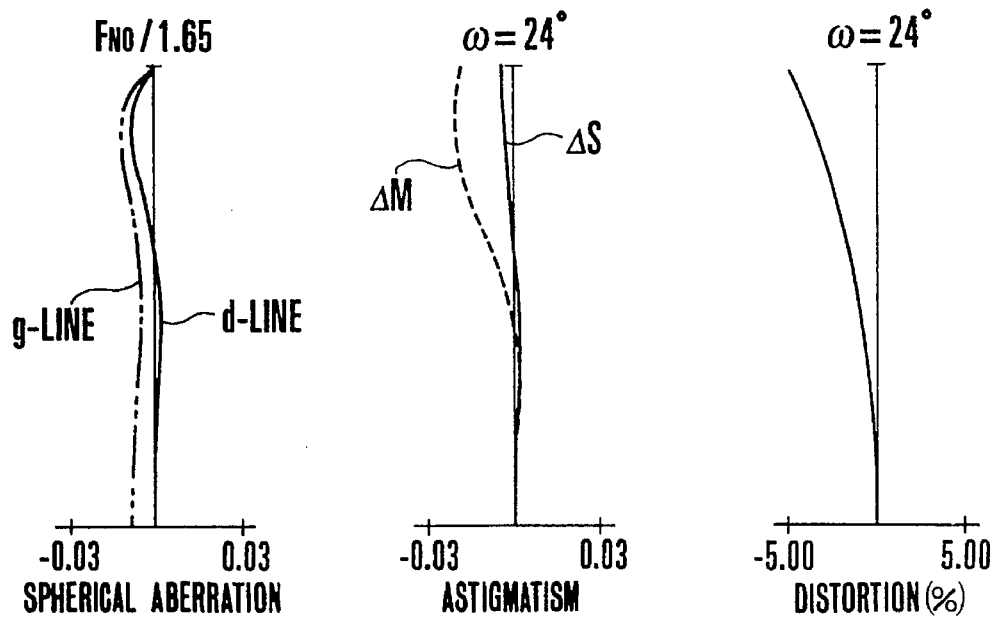
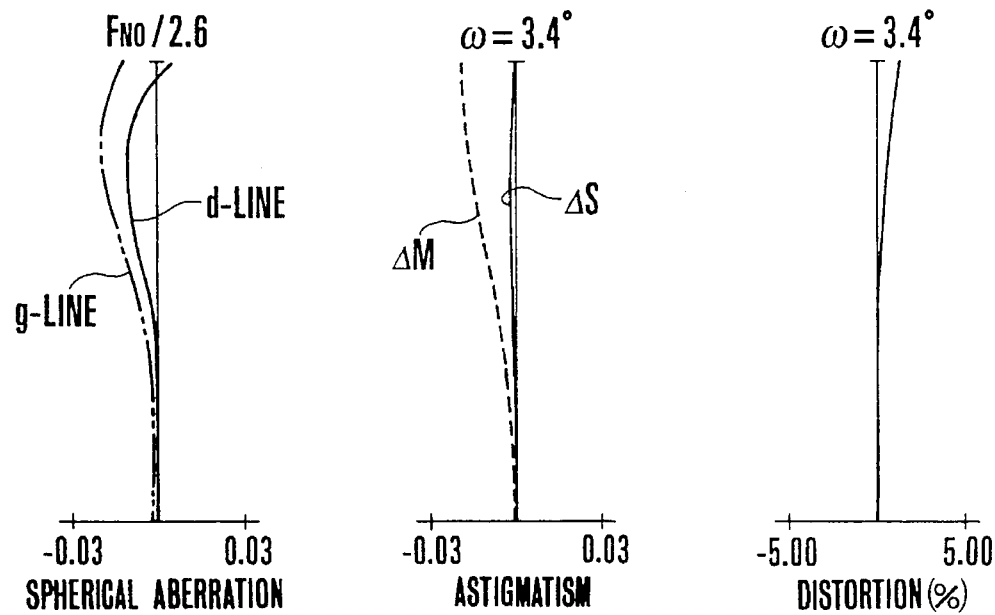

FIG.14(A)(1)
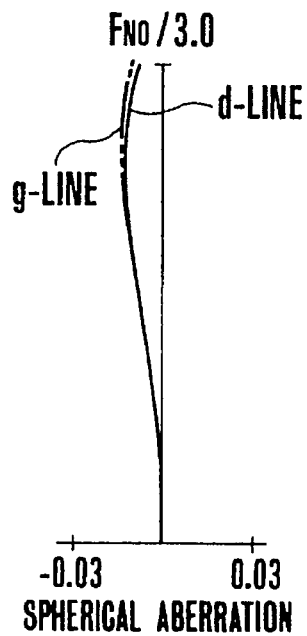
FIG.14(A)(2)
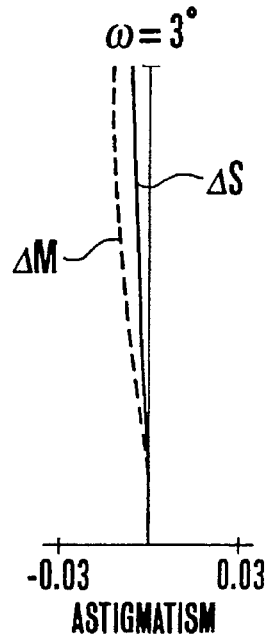
FIG.14(A)(3)
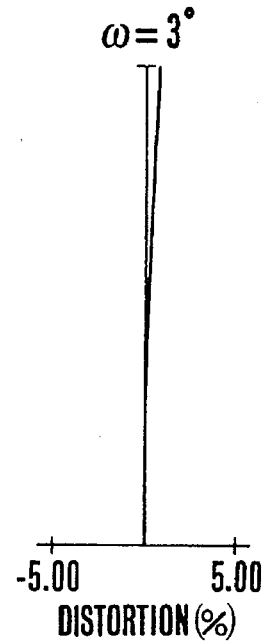
FIG.14(B)(1)
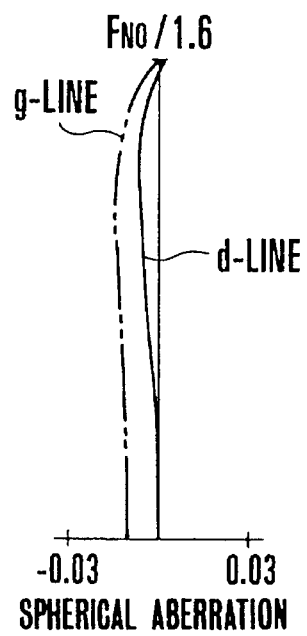
FIG.14(B)(2)
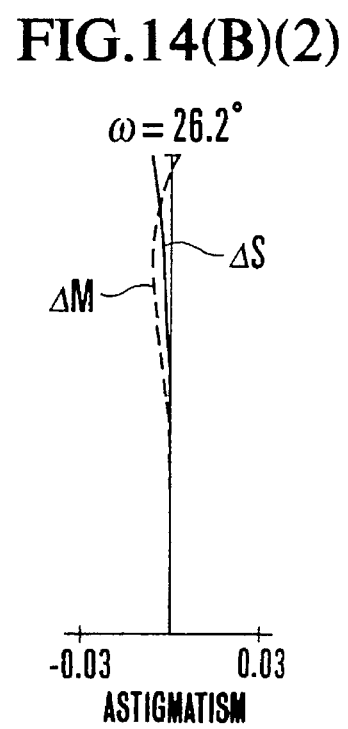
FIG.14(B)(3)
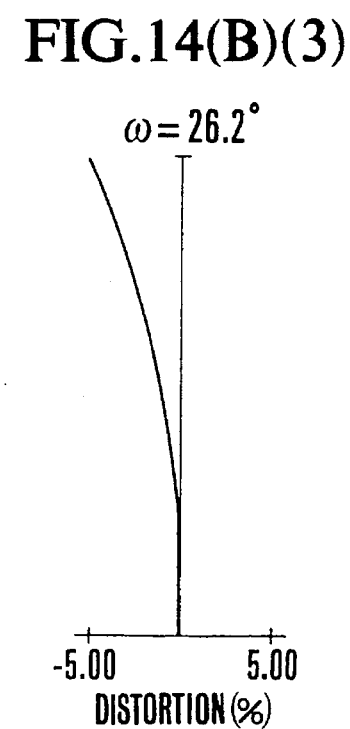

FIG.16(A)(1)   FIG.16(A)(2)   FIG.16(A)(3)
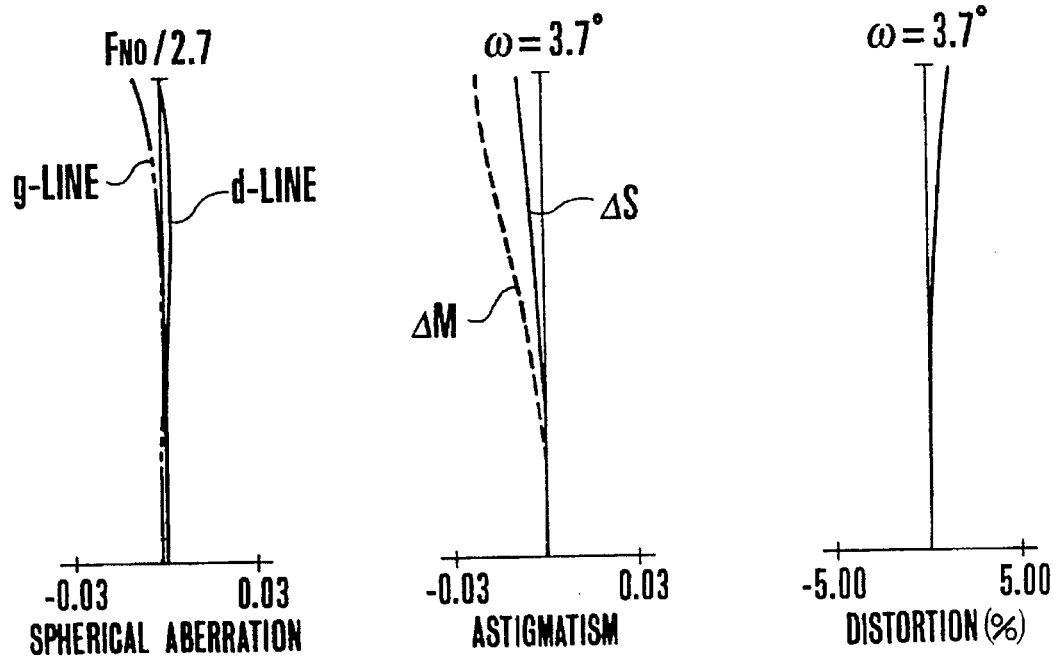
FIG.16(B)(1)   FIG.16(B)(2)   FIG.16(B)(3)
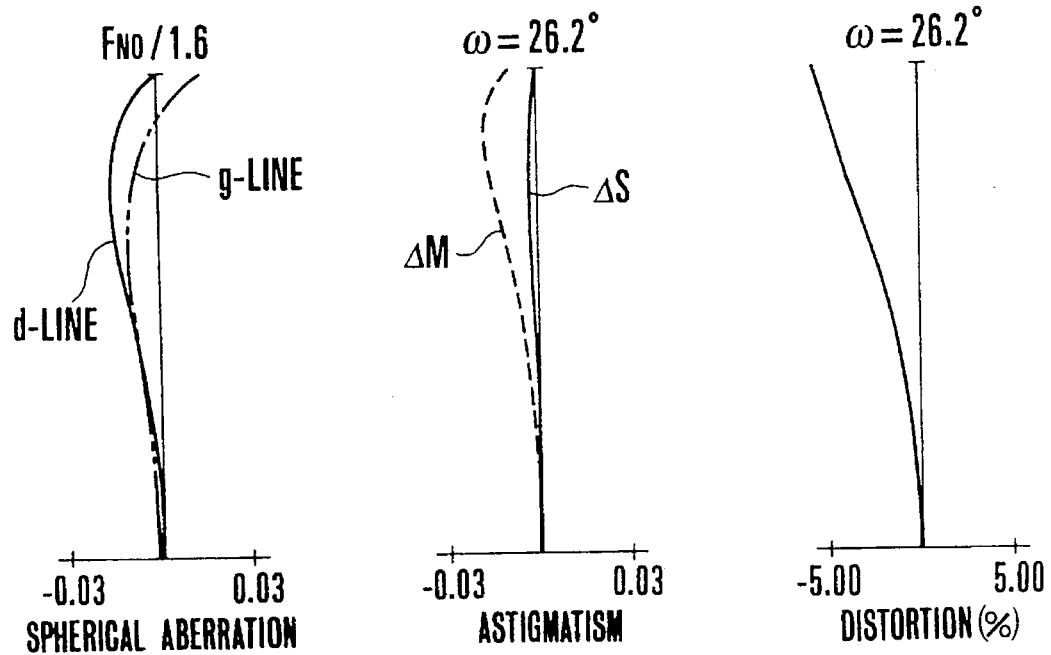

FIG.18(A)(1) FIG.18(A)(2) FIG.18(A)(3)
FIG.18(B)(1) FIG.18(B)(2) FIG.18(B)(3)
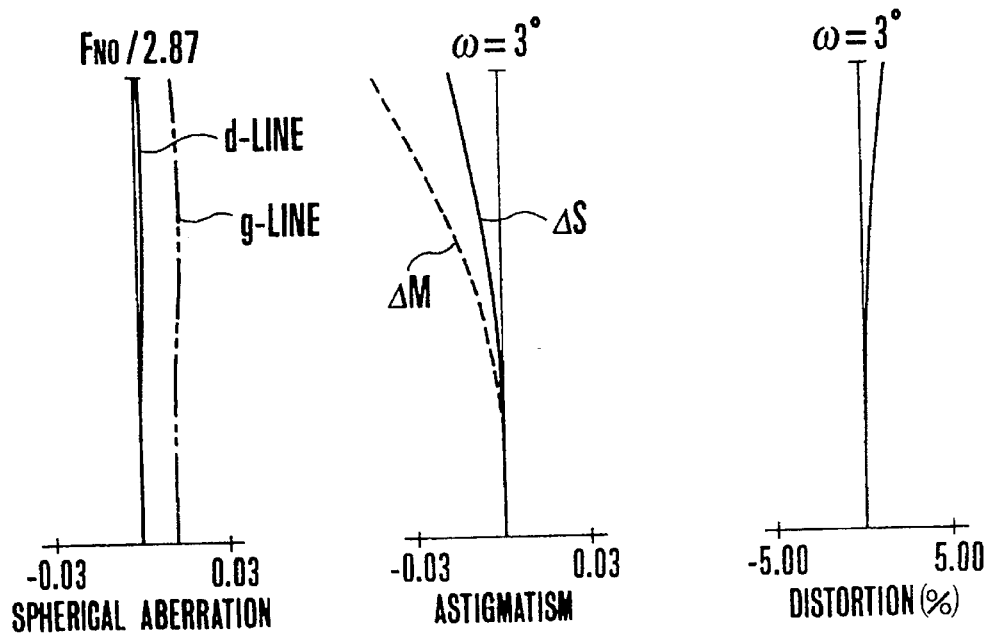
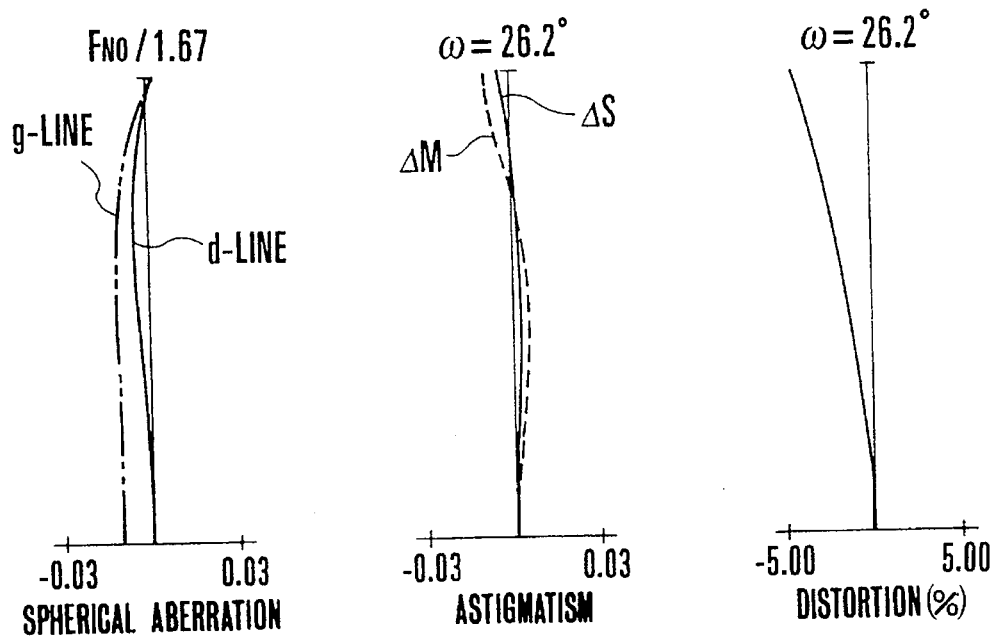

ZOOM LENS

BACKGROUND OF THE INVENTION

1. Field of the Invention

This invention relates to zoom lenses of the rear focus type and, more particularly, to large relative aperture, high range zoom lenses of the rear focus type. Still more particularly it relates to such zoom lenses having a range of 12 and an F-number of about 1.8 to be used in photographic cameras, video cameras or broadcasting cameras.

2. Description of the Related Art

Recently, the trend of reducing the size and weight of cameras is prevalent as can be seen in home video cameras. Along with this, a great advance is marked even in developing compact zoom lenses for photography. The efforts are being concentrated particularly on shortening the total length of the entire lens system, minimizing the diameter of the front lens members, and simplifying the rules of lens design.

To accomplish these aims, one measure is to make the focusing provision in other than the front or first lens unit. This is known as the so-called rear focus type.

The zoom lenses of the rear focus type generally have advantages over the conventional type which moves the first lens unit for focusing, in that the first lens unit gets smaller in diameter, thereby making it easier to construct the entire lens system in compact form. Close-up photography, particularly ultrashort focusing, also becomes easy to perform. Further, because the focusing lens unit is relatively small in size and light in weight, a weaker driving power suffices for moving such a focusing lens unit. If the driving power remains unchanged, quicker focus adjustment becomes possible.

Such a rear focus type zoom lens is disclosed in, for example, Japanese Laid-Open Patent Application No. Sho 58-160913. In this example, four lens units are used, whose power arrangement is plus, minus, plus and plus in this order from the object side. Zooming is performed by moving the first three lens units, of which at least one lens unit is made use of for focusing purposes. In other Japanese Laid-Open Patent Applications Nos. Sho 62-24213 and Sho 62-247316, a zoom lens comprises, from front to rear, a first lens unit of positive refractive power, a second lens unit of negative refractive power, a third lens unit of positive refractive power and a fourth lens unit of positive refractive power, wherein the second lens unit is moved to vary the focal length, while the fourth lens unit is simultaneously moved to compensate for the image shift, and wherein the fourth lens unit is used for focusing purposes.

Further, other Japanese Laid-Open Patent Applications Nos. Hei 4-43311 and Hei 4-153615 propose zoom lenses of the rear focus type in which the fourth lens unit takes a more rear position when in the telephoto end than when in the wide-angle end. This permits the focusing movement of the fourth lens unit to increase when in the telephoto positions, thereby making it possible to do ultrashort focusing (telephotomacrography).

In general, the use of the rear focus type in the zoom lens leads to obtaining, as mentioned before, the advantages that the lens system is entirely minimized in bulk and size, that quick focusing becomes possible, and further that close-up photography becomes easy to do.

For the counterpart, however, the range of variation of aberrations with focusing is caused to increase rapidly. So, the problem of maintaining good stability of high optical performance throughout the entire focusing range becomes very difficult to solve.

Particularly for a zoom lens of high range with a large aperture ratio, another even more difficult problem arises in that the high optical performance must be maintained stable not only throughout the focusing range, but also throughout the extended zooming range.

So, all the above-described zoom lenses of the rear focus type have their zoom ratios restricted to 8 or below. As regards the use of such zoom lenses in video cameras, the zoom ratio is not always high enough.

Japanese Laid-Open Patent Applications Nos. Hei 2-55308, Hei 4-26811 and Hei 4-88309 propose zoom lenses of the rear focus type, wherein their improvements are not always sufficient in the points of reducing the diameter of the front lens members and of shortening the total length of the entire system, that is, in the compact form of the entire lens system.

SUMMARY OF THE INVENTION

An object of the invention is to provide a zoom lens of the rear focus type. Despite the use of the rear focus type in combination with the increased aperture ratio and the extended zooming range, the compact form of the entire lens system is greatly improved, while still permitting good stability of optical performance to be maintained throughout the entire zooming range and throughout the entire focusing range which is extended to an ultrashort minimum distance.

A zoom lens of the rear focus type of the invention comprises, from front to rear, a first lens unit of positive refractive power, a second lens unit of negative refractive power, a third lens unit of positive refractive power and a fourth lens unit of positive refractive power, the focal length being varied from the wide-angle end to the telephoto end by moving the second lens unit axially toward the image side while simultaneously moving the fourth lens unit axially to compensate for the image shift, and focusing being performed by axially moving the fourth lens unit, wherein the third lens unit includes at least one positive lens at a front position and a negative lens of meniscus form concave toward the image side at a rearmost position and the fourth lens unit includes one negative lens and two positive lenses, and wherein the focal lengths f3 and f4 of the third and fourth lens units, respectively, satisfy the following condition:

$$0.73 < f_3/f_4 < 1.00 \tag{1}$$

Otherwise, a zoom lens of the rear focus type is constructed, comprising, from front to rear, a first lens unit having a positive refractive power, a second lens unit having a negative refractive power, a third lens unit having a positive refractive power and a fourth lens unit having a positive refractive power, the second and fourth lens units axially moving to effect zooming, and the fourth lens unit performing the function of compensating for the image shift and the focusing function, wherein the first and third lens units are fixed and, letting the focal length of the i-th lens unit be denoted by fi, the following condition is satisfied:

$$0.60 < f_3/f_4 < 0.95 \tag{2}$$

Further, the zoom lens of the rear focus type includes a stop located on the object side of the third lens unit, wherein an aspheric surface is introduced into the third lens unit, and the following condition is satisfied:

$$0.60 < |f2|/fW < 1.1 \quad (3)$$

where fW is the shortest focal length of the entire system.

BRIEF DESCRIPTION OF THE DRAWINGS

FIG. 1 Is a lens block diagram of a numerical example 1 of the invention.

FIG. 2 is a lens block diagram of a numerical example 2 of the invention.

FIGS. 5(A)(1) through 5(A)(3), 5(B)(1) through 5(B)(3), and 5(C)(1) through 5(C)(3) are graphic representations of the various aberrations of the numerical example 1 of the invention.

FIGS. 6(A)(1) through 6(A)(3), 6(B)(1) through 6(B)(3), and 6(C)(1) through 6(C)(3) are graphic representations of the various aberrations of the numerical example 2 of the invention.

FIGS. 7(A)(1) through 7(A)(3), 7(B)(1) through 7(B)(3), and 7(C)(1) through 7(C)(3) are graphic representations of the various aberrations of the numerical example 3 of the invention.

FIGS. 8(A)(1) through 8(A)(3), 8(B)(1) through 8(B)(3), and 8(C)(1) through 8(C)(3) are graphic representations of the various aberrations of the numerical example 4 of the invention.

FIGS. 10(A)(1) through 10(A)(3) and 10(B)(1) through 10(B)(3) are graphic representations of the various aberrations of the numerical example 5 of the invention.

FIGS. 12(A)(1) through 12(A)(3) and 12(B)(1) through 12(B)(3) are graphic representations of the various aberrations of the numerical example 6 of the invention.

FIGS. 14(A)(1) through 14(A)(3) and 14(B)(1) through 14(B)(3) are graphic representations of the various aberrations of the numerical example 7 of the invention.

FIGS. 16(A)(1) through 16(A)(3) and 16(B)(1) through 16(B)(3) are graphic representations of the various aberrations of the numerical example 8 of the invention.

FIGS. 18(A)(1) through 18(A)(3) and 18(B)(1) through 18(B)(3) are graphic representations of the various aberrations of the numerical example 9 of the invention.

Figure 3:
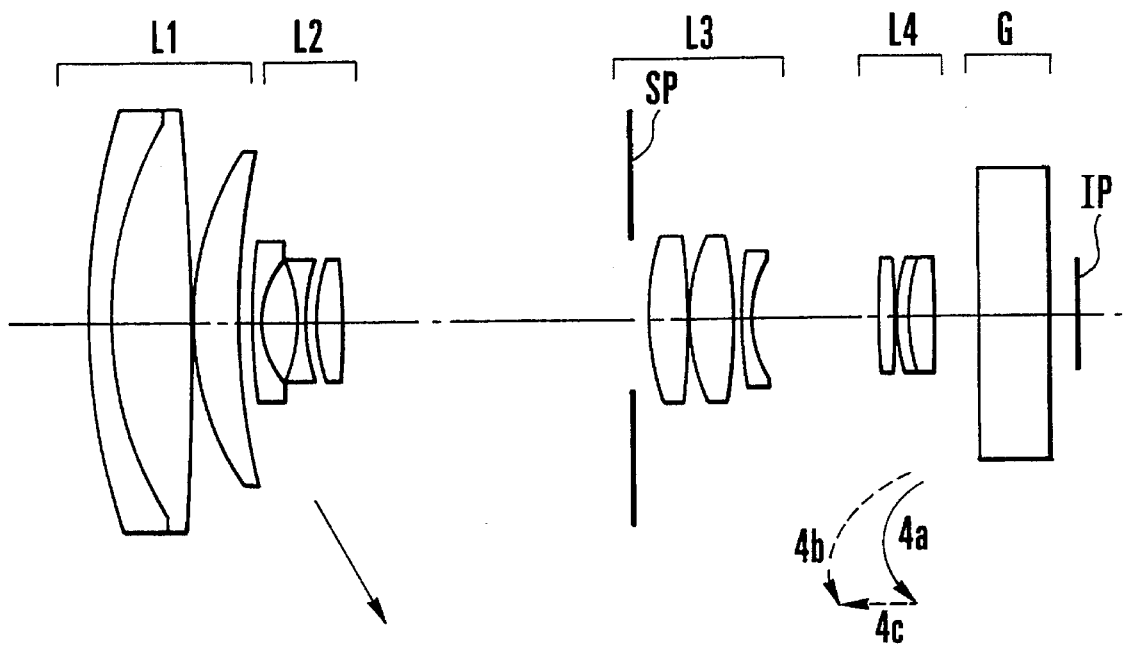
FIG. 3 is a lens block diagram of a numerical example 3 of the invention.
Figure 4:
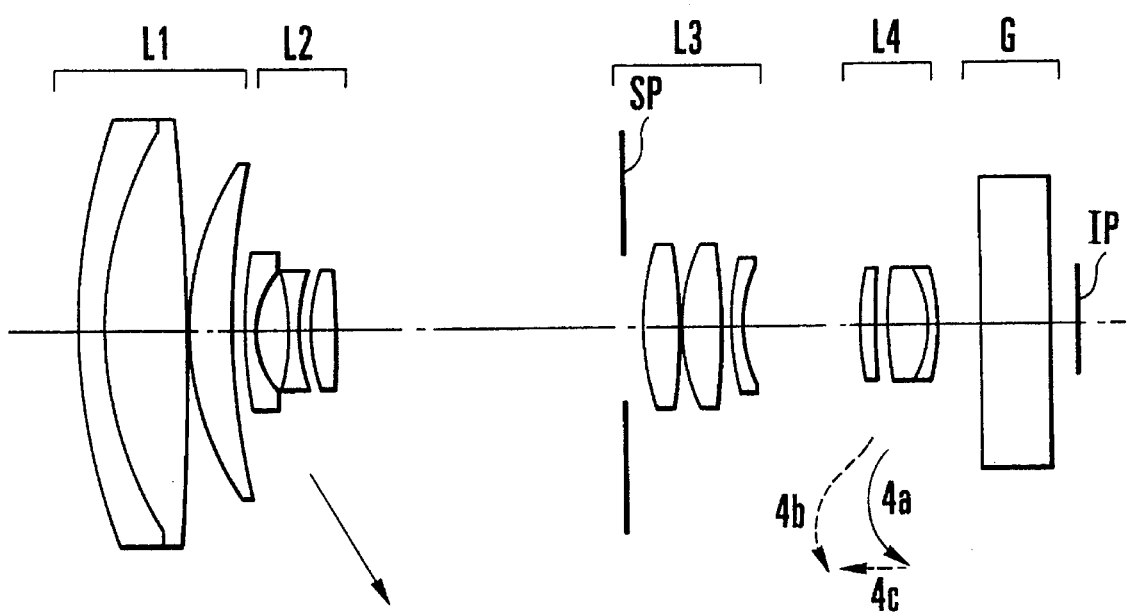
FIG. 4 is a lens block diagram of a numerical example 4 of the invention.

In the drawings, reference Roman numeral I denotes the first lens unit; reference Roman numeral II denotes the second lens unit; reference Roman numeral III denotes the third lens unit; and reference Roman numeral IV denotes the fourth lens unit. ΔS stands for the sagittal image focus; ΔM for the meridional image focus; d for the spectral d-line; and g for the spectral g-line.

DETAILED DESCRIPTION OF THE PREFERRED EMBODIMENTS

An embodiment of a zoom lens of the rear focus type according to the invention is shown in FIG. 1 to FIG. 4 by way of the numerical examples 1 to 4 in the wide-angle end. For the numerical example 1, the aberrations are illustrated in FIGS. 5(A)(1) to 5(C)(3), for the numerical example 2 in FIGS. 6(A)(1) to 6(C)(3), for the numerical example 3 in FIGS. 7(A)(1) to 7(C)(3), and for the numerical example 4 in FIGS. 8(A)(1) to 8(C)(3). Of the aberration curves, the ones in the wide-angle end are given in FIGS. 5(A)(1) through 5(A)(3), 6(A)(1) through 6(A)(3), 7(A)(1) through 7(A)(3) and 8(A)(1) through 8(A)(3), the ones in an intermediate position in FIGS. 5(B)(1) through 5(B)(3), 6(B)(1) through 6(B)(3), 7(B)(1) through 7(B)(3), and 8(B)(1) through 8(B)(3), and the ones in the telephoto end in FIG. 5(C)(1) through 5(C)(3), 6(C)(1) through 6(C)(3), 7(C)(1) through 7(C)(3), and 8(C)(1) through 8(C)(3).

The zoom lens comprises, from front to rear, a first lens unit L1 of positive refractive power, a second lens unit L2 of negative refractive power, a third lens unit L3 of positive refractive power and a fourth lens unit L4 of positive refractive power, followed by a glass block G representative of a face block and filters. An aperture stop SP is located in front of the third lens unit L3. IP stands for an image plane.

In the present embodiment, when zooming from the wide-angle end to the telephoto end, as shown by the arrows, the second lens unit axially moves toward the image side, while simultaneously moving the fourth lens unit axially in a locus convex toward the object side to compensate for the shift of the image plane IP.

The fourth lens unit is made movable also for focusing. That is, the rear focus type is employed. In FIGS. 1 to 4, for the fourth lens unit, a solid line curve 4a and a dashed line curve 4b are the loci of motion with zooming from the wide-angle end to the telephoto end to compensate for the image shift, when focused on an infinitely distant object and a close object, respectively. It should be noted that the first and third lens units remain stationary during zooming and focusing.

In the present embodiment, the provision for compensating for the image shift with zooming, and the focusing provision are made in one and the same lens unit, or the fourth lens unit. Particularly, the locus of motion of the fourth lens unit over the entire zooming range is made convex toward the object side as shown in FIGS. 1 to 4 by the curves 4a and 4b. This assures an increase of the efficiency with which to use the air space between the third and fourth lens units. Thus, the shortening of the total length of the complete lens is achieved advantageously.

In the present embodiment, with the setting to, for example, the telephoto end, when focusing down from an infinitely distant object to an object at the minimum distance, the fourth lens unit axially moves forward as shown by a straight line 4c in FIGS. 1 to 4.

Since the zoom lens of the invention has its range increased to 12 in the zoom ratio, the total zooming movement of the fourth lens unit gets comparatively longer. The range of variation of aberrations with zooming, too, is, therefore, liable to increase. Along with this, the total focusing movement for the fourth lens unit is made also to increase at the telephoto end. Therefore, it becomes difficult to maintain good stability of aberration correction throughout the extended focusing range.

On this account, the present invention sets forth special rules for the construction and arrangement of the constituent lenses of the third and fourth lens units, as stated before, in order to correct well the variation of aberrations with zooming and focusing. Another rule is that the rearmost lens in the third lens unit is made negative in power and formed to a meniscus shape with the rear surface of stronger concave curvature toward the image side in order to elongate the back focal distance which would otherwise tend to be insufficient when the size of the lens system decreases. In addition, the refractive powers of the third and fourth lens units are determined based on the condition (1) stated before. When this condition is satisfied, the size of the entire lens system is decreased in such a manner that all aberrations are well corrected.

Within the zoom lens configuration according to the invention, when much desired reduction of the size of the entire system is pursued, the focal length f3 suffers decreasing to so much extent that the third lens unit becomes a convergent system for the emerging axial light beam. For this reason, a shorter back focal distance results. To solve this problem, the above-mentioned negative lens of meniscus form in the third lens unit plays an important role. Also, because the incident axial light beam on the fourth lens unit is converging, its height of incidence varies to a large extent with movement of the fourth lens unit. For this reason, a wide range of variation of aberrations results. To solve this problem, the construction and arrangement of the constituent lenses of the fourth lens unit play an important role.

With these points in mind, the present invention sets forth the above-described features or conditions for the third and fourth lens units. According to these design rules, the requirements of minimizing the size of the entire lens system and of correcting well all aberrations can be fulfilled at once.

The technical significance of the inequalities of condition (1) is explained below. When the upper limit of the condition (1) is exceeded, as this means that the focal length f3 is too long, the back focal distance becomes too long so that it becomes difficult to minimize the size of the entire lens system. When the focal length f3 is too short as exceeding the lower limit, the back focal distance becomes too short. To elongate it, the refractive power of the negative lens of meniscus form in the third lens unit has to be strengthened. If so, the curvature becomes too tight, causing production of large aberrations, among others, spherical aberration and coma, which are difficult to correct well.

The above-described features or conditions suffice for achieving the zoom lens of the rear focus type the invention aims at. To further improve the optical performance throughout the entire zooming range, it is recommended to construct the second lens unit as comprising, from front to rear, a negative first lens of meniscus form having a strong concave surface facing the image side, a negative second lens of which both surfaces are concave and a positive third lens having a convex surface of stronger refracting power facing the object side than that of the surface facing the image side, totaling three single lenses.

In the present embodiment, by using the above-stated feature for the second lens unit, the range of variation of, particularly, distortion with zooming is lessened. The conventional zoom lenses would have generally their distortion exceeding −5% in the wide-angle end, or amounting to +5% or thereabout in the telephoto end.

In the present embodiment, on the other hand, the distortion is significantly decreased to less than −5% in the wide-angle end, or to below +3% in the telephoto end.

Another feature is that the front principal point of the second lens unit is brought to a more front position, thereby shortening the principal point interval with the first lens unit. Also, the first lens unit is made to approach the stop. This leads to lower the height of incidence of the off-axial light beam on the first lens unit from the optical axis. The diameter of the first lens unit is thus reduced in order to insure that the complete lens is not only shortened in the total length but also improved in compact form and reduced in weight.

In the present embodiment, for the second lens unit, the negative second lens and the positive third lens are arranged in broken contact (not cemented together). Therefore, both lenses form an air lens which assists in correcting aberrations, thereby giving an advantage of correcting spherical aberration, coma, longitudinal chromatic aberration and other aberrations in good balance.

In the present embodiment, since the second and third lenses in the second lens unit are constructed in the form of separate single lenses (not a cemented lens), the axial light beam travels through the second lens unit in such a way that after having emerged from the second lens, it rises before arriving at the third lens, so that the height of incidence on the third lens becomes higher than when the cemented lens is in use as is common in the prior art.

For this reason, the effect of correcting various aberrations by the third lens would become too much strong. To compensate for this excess, the front surface of the third lens, the rear surface of the first lens and both surfaces of the second lens can be made looser in curvature than were heretofore possible.

In the present embodiment, the various aberrations the second lens unit produces are thus lessened to thereby improve the variation of aberrations with zooming.

Next, numerical examples 1 to 4 of zoom lenses of the invention are shown. In the numerical data for the examples 1 to 4, Ri is the curvature of the i-th lens surface, when counted from the object side, Di is the i-th axial lens thickness or air separation, when counted from the object side, and Ni and vi are respectively the refractive index and Abbe number of the glass of the i-th lens elements, when counted from the object side. In the numerical examples, the last two surfaces define a glass block representative of a face plate and filters.

The shape of an aspheric surface is expressed in the coordinates with an X axis in the axial direction and an H axis in the direction perpendicular to the optical axis, the direction in which light advances being taken as positive, by the following equation:

$$X = (1/R)^2 / (1 + \sqrt{1 - (1+K)(H/R)^2}) + BH^4 + CH^6 + DH^8 + EH^{10}$$

where R is the radius of the osculating sphere, and K, B, C, D and E are the aspheric coefficients.

Numerical Example 1:

| f = 1–12.01 | Fno. = 1:1.8–2.6 | 2ω = 64.3°–6.0° | |
|---|---|---|---|
| R1 = 9.584 | D1 = 0.255 | N1 = 1.84666 | v1 = 23.8 |
| R2 = 4.918 | D2 = 1.139 | N2 = 1.60311 | v2 = 60.7 |
| R3 = −43.318 | D3 = 0.039 | | |
| R4 = 4.096 | D4 = 0.599 | N3 = 1.71300 | v3 = 53.8 |
| R5 = 10.014 | D5 = Variable | | |
| R6 = 6.188 | D6 = 0.117 | N4 = 1.88300 | v4 = 40.8 |
| R7 = 1.209 | D7 = 0.520 | | |
| R8 = −2.220 | D8 = 0.117 | N5 = 1.77250 | v5 = 49.6 |
| R9 = 2.220 | D9 = 0.150 | | |
| R10 = 2.646 | D10 = 0.353 | N6 = 1.84666 | v6 = 23.8 |
| R11 = −11.640 | D11 = Variable | | |
| R12 = (Stop) | D12 = 0.216 | | |
| R13 = 2.915 | D13 = 0.613 | N7 = 1.58313 | v7 = 59.4 |
| R14 = −8.355 | D14 = 0.029 | | |

-continued

| | | | |
|---|---|---|---|
| R15 = 2.695 | D15 = 0.458 | N8 = 1.63854 | ν8 = 55.4 |
| R16 = −24.147 | D16 = 0.123 | | |
| R17 = 6.138 | D17 = 0.137 | N9 = 1.72825 | ν9 = 28.5 |
| R18 = 1.714 | D18 = Variable | | |
| R19 = 2.550 | D19 = 0.117 | N10 = 1.80518 | ν10 = 25.4 |
| R20 = 1.424 | D20 = 0.530 | N11 = 1.51633 | ν11 = 64.2 |
| R21 = −14.796 | D21 = 0.029 | | |
| R22 = 5.917 | D22 = 0.235 | N12 = 1.51633 | ν12 = 64.2 |
| R23 = −31.294 | D23 = 0.589 | | |
| R24 = ∞ | D24 = 0.982 | N13 = 1.51633 | ν13 = 64.2 |
| R25 = ∞ | | | |

Aspheric Coefficients: R13
R = 2.915  K = 1.432  B = −2.274 × $10^{-2}$
C = −2.665 × $10^{-3}$  D = −2.484 × $10^{-4}$  E = 1.433 × $10^{-4}$

| Variable | Focal Length | | |
|---|---|---|---|
| Separation | 1.00 | 3.44 | 12.01 |
| D5 | 0.18 | 2.56 | 3.95 |
| D11 | 4.03 | 1.65 | 0.26 |
| D18 | 1.66 | 0.63 | 1.42 | f3/f4 = 0.816

Numerical Example 2:

f = 1–12.00   Fno. = 1:1.8–2.5   2ω = 64.3°–6.0°

| | | | |
|---|---|---|---|
| R1 = 9.495 | D1 = 0.255 | N1 = 1.84666 | ν1 = 23.8 |
| R2 = 4.990 | D2 = 1.139 | N2 = 1.60311 | ν2 = 60.7 |
| R3 = −47.337 | D3 = 0.039 | | |
| R4 = 4.064 | D4 = 0.599 | N3 = 1.71300 | ν3 = 53.8 |
| R5 = 9.696 | D5 = Variable | | |
| R6 = 6.607 | D6 = 0.117 | N4 = 1.88300 | ν4 = 40.8 |
| R7 = 1.230 | D7 = 0.520 | | |
| R8 = −2.298 | D8 = 0.117 | N5 = 1.77250 | ν5 = 49.6 |
| R9 = 2.298 | D9 = 0.150 | | |
| R10 = 2.731 | D10 = 0.353 | N6 = 1.84666 | ν6 = 23.8 |
| R11 = −13.327 | D11 = Variable | | |
| R12 = (Stop) | D12 = 0.216 | | |
| R13 = 2.709 | D13 = 0.637 | N7 = 1.58313 | ν7 = 59.4 |
| R14 = −8.485 | D14 = 0.029 | | |
| R15 = 2.208 | D15 = 0.505 | N8 = 1.63854 | ν8 = 55.4 |
| R16 = 159.833 | D16 = 0.123 | | |
| R17 = 5.431 | D17 = 0.137 | N9 = 1.74077 | ν9 = 27.8 |
| R18 = 1.390 | D18 = Variable | | |
| R19 = 3.333 | D19 = 0.451 | N10 = 1.51633 | ν10 = 64.2 |
| R20 = −2.532 | D20 = 0.117 | N11 = 1.84666 | ν11 = 23.8 |
| R21 = −4.570 | D21 = 0.029 | | |
| R22 = 4.439 | D22 = 0.235 | N12 = 1.51633 | ν12 = 64.2 |
| R23 = 15.125 | D23 = 0.589 | | |
| R24 = ∞ | D24 = 0.982 | N13 = 1.51633 | ν13 = 64.2 |
| R25 = ∞ | | | |

Aspheric Coefficients: R13
R = 2.709  K = 1.185  B = −2.269 × $10^{-2}$
C = −3.263 × $10^{-3}$  D = 1.873 × $10^{-4}$  E = −1.852 × $10^{-4}$

| Variable | Focal Length | | |
|---|---|---|---|
| Separation | 1.00 | 3.44 | 12.00 |
| D5 | 0.18 | 2.56 | 3.95 |
| D11 | 4.03 | 1.65 | 0.26 |
| D18 | 1.67 | 0.71 | 1.46 | f3/f4 = 0.964

Numerical Example 3:

f = 1–12.00   Fno. = 1:1.8–2.5   2ω = 64.3°–6.0°

| | | | |
|---|---|---|---|
| R1 = 9.585 | D1 = 0.255 | N1 = 1.84666 | ν1 = 23.8 |
| R2 = 5.063 | D2 = 1.139 | N2 = 1.60311 | ν2 = 60.7 |
| R3 = −43.248 | D3 = 0.039 | | |
| R4 = 4.105 | D4 = 0.599 | N3 = 1.71300 | ν3 = 53.8 |
| R5 = 9.849 | D5 = Variable | | |
| R6 = 7.587 | D6 = 0.117 | N4 = 1.88300 | ν4 = 40.8 |
| R7 = 1.244 | D7 = 0.520 | | |
| R8 = −2.307 | D8 = 0.117 | N5 = 1.77250 | ν5 = 49.6 |
| R9 = 2.307 | D9 = 0.150 | | |
| R10 = 2.770 | D10 = 0.353 | N6 = 1.84666 | ν6 = 23.8 |
| R11 = −11.822 | D11 = Variable | | |
| R12 = (Stop) | D12 = 0.216 | | |
| R13 = 3.405 | D13 = 0.520 | N7 = 1.58313 | ν7 = 59.4 |
| R14 = −10.290 | D14 = 0.029 | | |
| R15 = 2.513 | D15 = 0.601 | N8 = 1.63854 | ν8 = 55.4 |
| R16 = −5.548 | D16 = 0.123 | | |
| R17 = 7.406 | D17 = 0.137 | N9 = 1.76182 | ν9 = 26.5 |
| R18 = 1.539 | D18 = Variable | | |
| R19 = 7.393 | D19 = 0.255 | N10 = 1.51633 | ν10 = 64.2 |
| R20 = −10.413 | D20 = 0.029 | | |
| R21 = 3.628 | D21 = 0.117 | N11 = 1.80518 | ν11 = 25.4 |
| R22 = 2.447 | D22 = 0.392 | N12 = 1.51633 | ν12 = 64.2 |
| R23 = −12.050 | D23 = 0.589 | | |
| R24 = ∞ | D24 = 0.982 | N13 = 1.51633 | ν13 = 64.2 |
| R25 = ∞ | | | |

Aspheric Coefficients: R13
R = 3.405  K = 2.650  B = −3.054 × $10^{-2}$
C = −4.716 × $10^{-3}$  D = −1.599 × $10^{-3}$  E = 8.430 × $10^{-4}$

| Variable | Focal Length | | |
|---|---|---|---|
| Separation | 1.00 | 3.42 | 12.00 |
| D5 | 0.18 | 2.56 | 3.95 |
| D11 | 4.03 | 1.65 | 0.26 |
| D18 | 1.74 | 0.74 | 1.51 | f3/f4 = 0.872

Numerical Example 4:

f = 1–11.99   Fno. = 1:1.8–2.5   2ω = 64.3°–6.0°

| | | | |
|---|---|---|---|
| R1 = 9.634 | D1 = 0.255 | N1 = 1.84666 | ν1 = 23.8 |
| R2 = 4.960 | D2 = 1.139 | N2 = 1.60311 | ν2 = 60.7 |
| R3 = −41.062 | D3 = 0.039 | | |
| R4 = 4.101 | D4 = 0.599 | N3 = 1.71300 | ν3 = 53.8 |
| R5 = 9.967 | D5 = Variable | | |
| R6 = 6.071 | D6 = 0.117 | N4 = 1.88300 | ν4 = 40.8 |
| R7 = 1.190 | D7 = 0.520 | | |
| R8 = −2.236 | D8 = 0.117 | N5 = 1.77250 | ν5 = 49.6 |
| R9 = 2.236 | D9 = 0.150 | | |
| R10 = 2.666 | D10 = 0.353 | N6 = 1.84666 | ν6 = 23.8 |
| R11 = −11.097 | D11 = Variable | | |
| R12 = (Stop) | D12 = 0.216 | | |
| R13 = 3.563 | D13 = 0.512 | N7 = 1.58313 | ν7 = 59.4 |
| R14 = −8.772 | D14 = 0.029 | | |
| R15 = 2.323 | D15 = 0.548 | N8 = 1.63854 | ν8 = 55.4 |
| R16 = −9.751 | D16 = 0.123 | | |
| R17 = 7.535 | D17 = 0.137 | N9 = 1.76182 | ν9 = 26.5 |
| R18 = 1.626 | D18 = Variable | | |
| R19 = 3.356 | D19 = 0.196 | N10 = 1.51742 | ν10 = 52.4 |
| R20 = 9.402 | D20 = 0.196 | | |
| R21 = 6.363 | D21 = 0.550 | N11 = 1.51742 | ν11 = 52.4 |
| R22 = −1.370 | D22 = 0.117 | N12 = 1.80518 | ν12 = 25.4 |
| R23 = −2.593 | D23 = 0.589 | | |
| R24 = ∞ | D24 = 0.982 | N13 = 1.51633 | ν13 = 64.2 |
| R25 = ∞ | | | |

-continued

Aspheric Coefficients: R13
R = 3.563   K = 2.468         B = −2.405 × 10⁻²
C = −1.233 × 10⁻⁴   D = −1.272 × 10⁻³   E = −2.165 × 10⁻⁴

| Variable | Focal Length | | |
|---|---|---|---|
| Separation | 1.00 | 3.38 | 11.99 |
| D5 | 0.18 | 2.56 | 3.95 |
| D11 | 4.03 | 1.65 | 0.26 |
| D18 | 1.64 | 0.65 | 1.41 | f3/f4 = 0.904

According to the invention, the rules of lens design are set forth as stated above. With these in use, when employing the rear focus type and when increasing the aperture ratio to 1.8 in F-number and the the zoom ratio to 12 at once, it is possible to achieve great improvement of the compact form of the entire lens system, while nonetheless permitting good stability of optical performance to be maintained throughout the extended zooming range and throughout the entire focusing range which is also extended to an ultrashort minimum.

Next, a further improved embodiment is described. FIGS. 9, 11, 13, 15 and 17 are longitudinal section views of specific examples 5 to 9 of zoom lenses of the invention. The various aberrations of these zoom lenses are shown in FIGS. 10(A)(1) through 10(A)(3), 10(B)(1) through 10(B)(3), 12(A)(1) through 12(A)(3), 12(B)(1) through 12(B)(3), 14(A)(1) through 14(A)(3), 14(B)(1) through 14(B)(3), 16(A)(1) through 16(A)(3), 16(B)(1) through 18(B)(3), 18(A)(1) through 18(A)(3), and 18(B)(1) through 18(B)(3), particularly with the ones suffixed (A) (i.e., (A)(1) through (A)(3)) in the wide-angle end, and the ones suffixed (B) (i.e., (B)(1) through (B)(3)) in the telephoto end.

Figure 9:
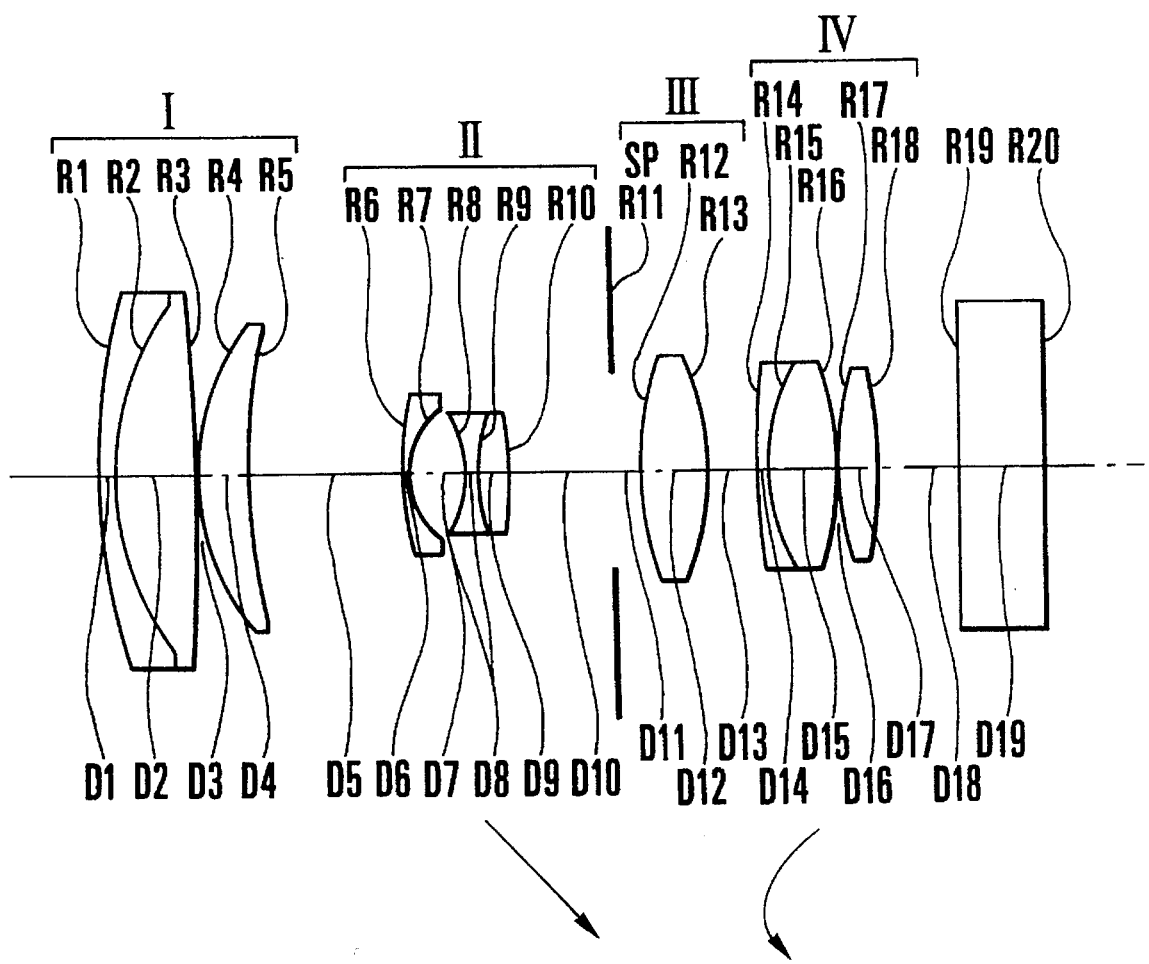
FIG. 9 is a lens block diagram of a numerical example 5 of the invention.
Figure 11:
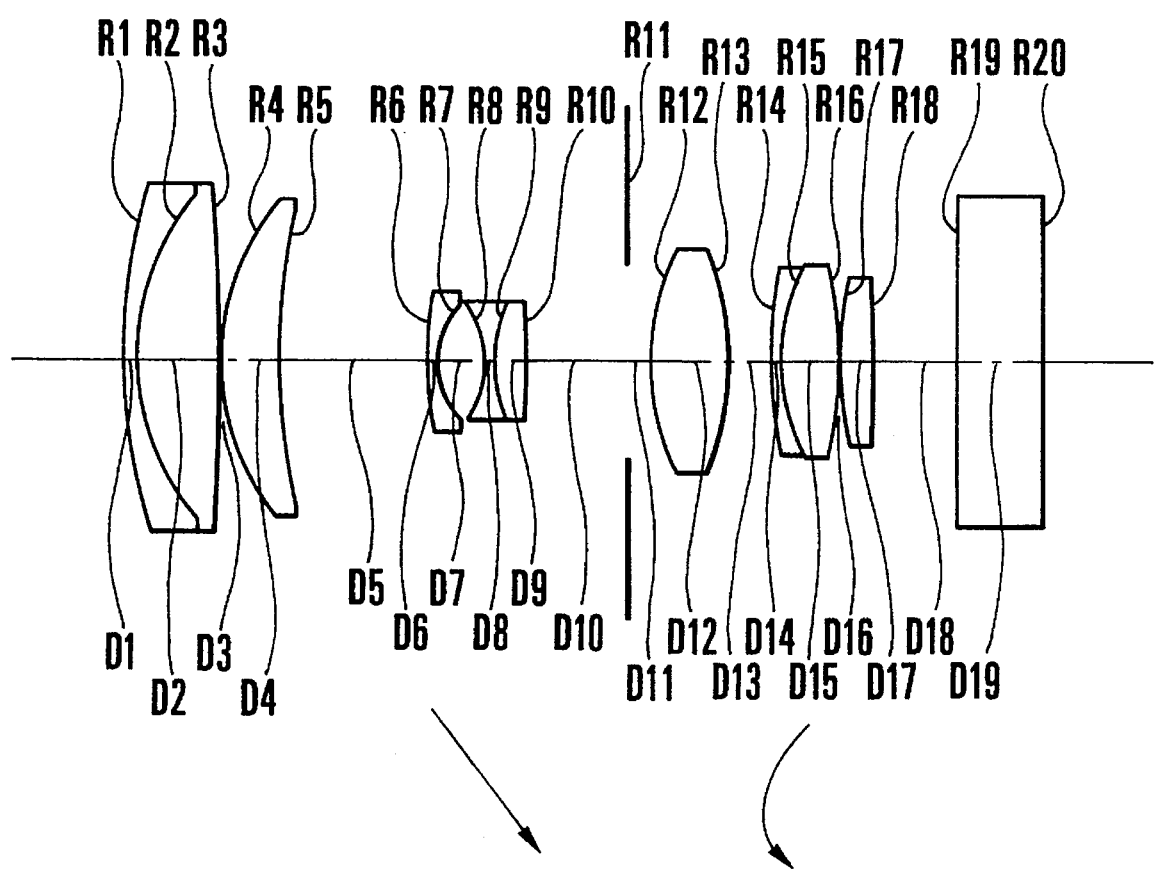
FIG. 11 is a lens block diagram of a numerical example 6 of the invention.
Figure 13:
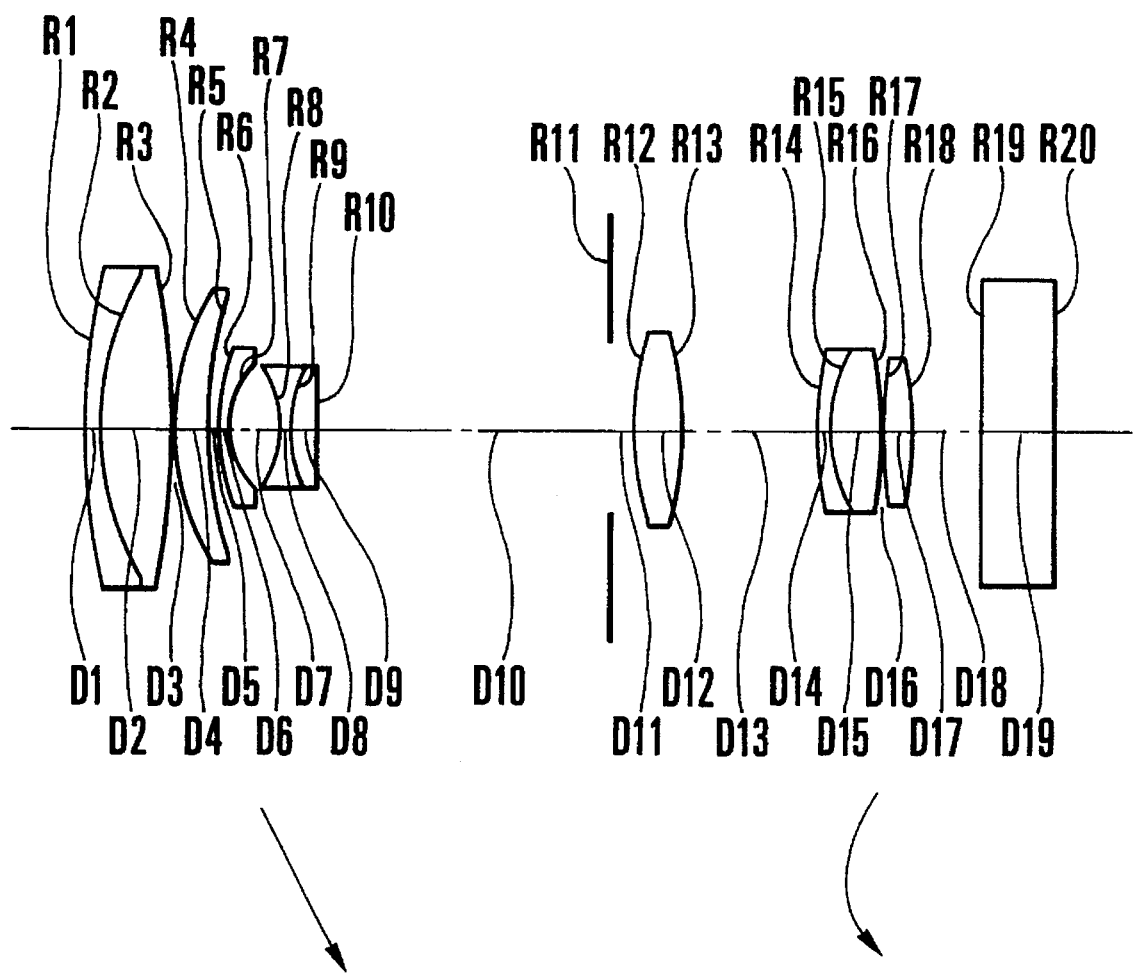
FIG. 13 is a lens block diagram of a numerical example 7 of the invention.
Figure 15:
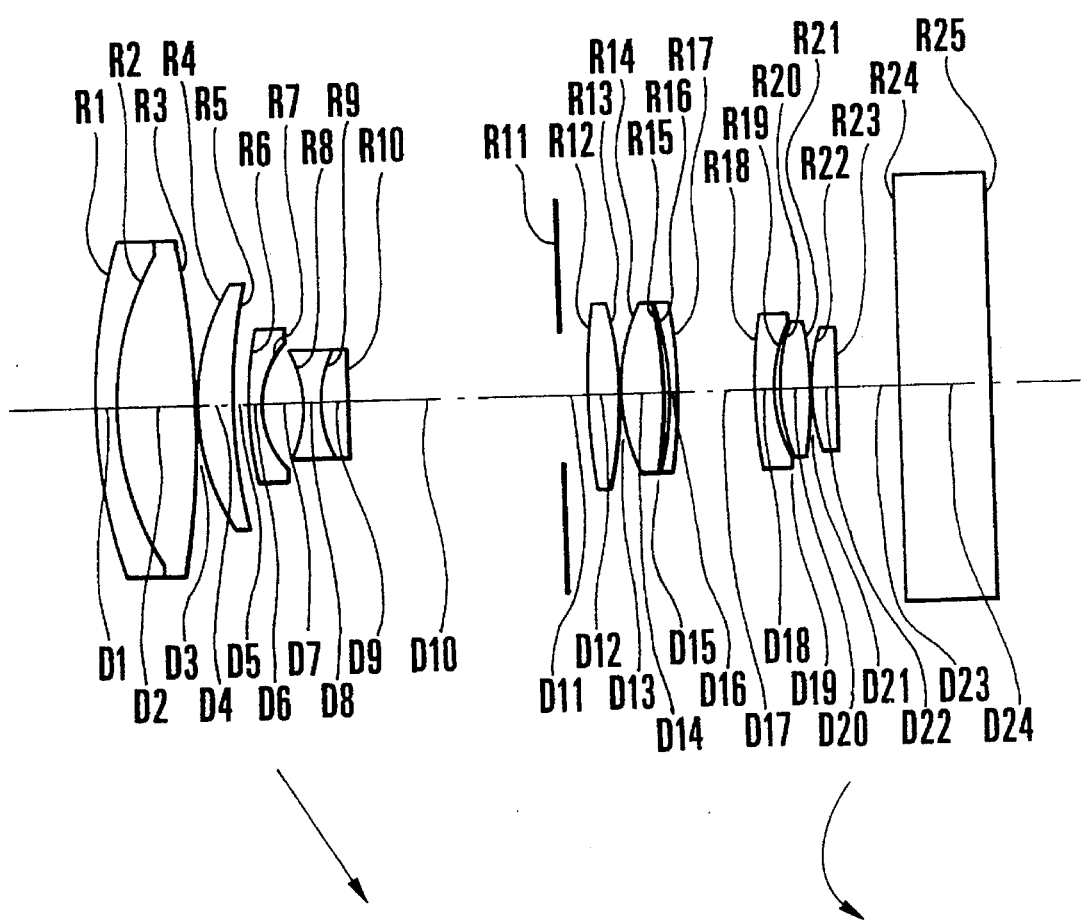
FIG. 15 is a block diagram of a numerical example 8 of the invention.
Figure 17:
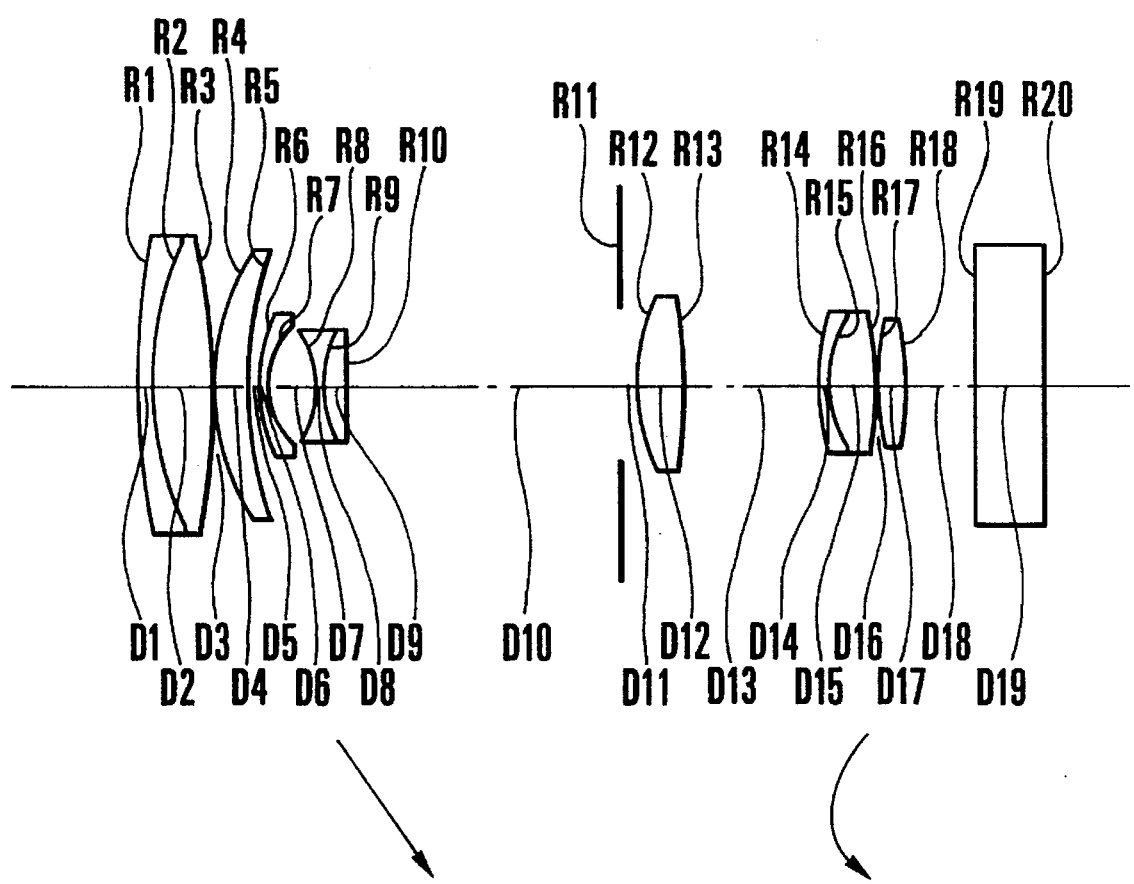
FIG. 17 is a lens block diagram of a numerical example 9 of the invention.

In FIG. 9, the zoom lens comprises, front front to rear, a first lens unit I of positive refractive power, a second lens unit II of negative refractive power, a third lens unit III of positive refractive power and a fourth lens unit IV of positive refractive power. An aperture stop SP is located in front of the third lens unit III.

In the present embodiment, the image shift with zooming is compensated for by moving the fourth lens unit and focusing is performed by moving the fourth lens unit. Particularly the locus the fourth lens unit forms when axially moving with zooming from the wide-angle end to the telephoto end, is made convex toward the object side. This assures an increase of the efficiency with which the air space between the third and fourth lens units is used, thereby facilitating achievement of a shortening of the total length of the complete lens.

In the present embodiment, for the focusing purposes, with the setting to, for example, the telephoto end, the fourth lens unit is made to move all the way toward the object side as the object distance decreases from infinity to the minimum.

As compared with the conventional zoom lenses of the 4-component type in which the first lens unit is used for focusing, it is in the present embodiment that the effective diameter of the first lens unit is effectively prevented from increasing by employing the rear focus method. In addition, the stop is located on the object side of the third lens unit to thereby minimize the effective diameter of the first lens unit.

Another feature of the present embodiment is that an aspherical lens is used in the third lens unit to thereby reduce the number of constituent lenses. At the same time, the correction for spherical aberration and coma is improved by the aspheric surface. Further, to improve the correction for curvature of field, coma and other off-axial aberrations, at least one more aspherical lens is used which takes its place in the second lens unit. Additional features are set forth as stated before by the inequalities of conditions (2) and (3). When these features or conditions are satisfied, improved results are attained in maintenance of the stability of optical performance throughout the entire zooming range and throughout the entire focusing range with limitation of the bulk and size of the entire lens system to a minimum.

The technical significance of each of the above-described conditions (2) and (3) is explained below.

The inequalities of condition (2) are concerned with the focal lengths of the third and fourth lens units and have an aim to achieve improvements of the compact form of the section that follows the stop SP, while still maintaining good optical performance. When the lower limit is exceeded, as this implies that the focal length of the third lens unit is too short, it becomes difficult to correct the variation of spherical aberration with zooming or focusing. There arise other problems in that the back focal distance also becomes difficult to secure, that the total movement of the fourth lens unit is increased, and so on. Conversely when the upper limit is exceeded, as this implies that the focal length of the fourth lens unit is too short, it becomes difficult to shorten the total length of the complete lens. It also results in that the angle at which the off-axial light beam is incident on the fourth lens unit is increased largely. So, it becomes difficult to correct the fourth lens unit for aberrations.

The inequalities of condition (3) are concerned with the refractive power of the second lens unit and have an aim to make a good compromise between the reduction of the variation of aberrations with zooming and the feasibility of obtaining a predetermined zoom ratio. When the refractive power of the second lens unit is too strong as exceeding the lower limit, it becomes easy to minimize the size of the entire lens system. However, the Petzval sum increases largely to the negative direction, causing production of large curvature of field. At the same time, the range of variation of aberrations with zooming increases largely. When the upper limit is exceeded, the variation of aberrations with zooming is improved. However, because the refractive power of the second lens unit is too weak, the total zooming movement of the second lens unit must be increased to obtain the predetermined zoom ratio. Therefore, the total length of the entire lens system is increased objectionably.

Next, numerical examples 5 to 9 of the invention are shown. In the numerical data for the examples 5 to 9, Ri is the radius of curvature of the i-th lens surface, when counted from the object side, Di is the i-th axial thickness or air separation, when counted from the object side, and Ni and vi are respectively the refractive index and Abbe number of the glass of the i-th lens element, when counted from the object side.

The shape of an aspheric surface is expressed in the coordinates with an X axis in the axial direction and an H axis in the direction perpendicular to the optical axis, the direction in which light advances being taken as positive, by the following equation:

$$X = (1/R)H^2 / (1 + \sqrt{1 - (1+K)(H/R)^2}) + BH^4 + CH^6 + DH^8 + EH^{10}$$

where R is the radius of the osculating sphere, and K, B, C, D and E are the aspheric coefficients.

The values of the factors in the conditions (2) and (3) for the numerical examples 5 to 9 are listed in Table-1. Incidentally, in the numerical examples, R19 and R20 define a face plate or like glass member.

Numerical Example 5:

| f = 1–7.65 | Fno. = 1:1.47–2.48 | 2ω = 53.2°–7.6° | |
|---|---|---|---|
| R1 = 6.679 | D1 = 0.156 | N1 = 1.80518 | ν1 = 25.4 |
| R2 = 2.978 | D2 = 0.782 | N2 = 1.60311 | ν2 = 60.7 |
| R3 = –23.827 | D3 = 0.023 | | |
| R4 = 2.513 | D4 = 0.469 | N3 = 1.64850 | ν3 = 53.0 |
| R5 = 7.028 | D5 = Variable | | |
| R6 = 3.338 | D6 = 0.078 | N4 = 1.88300 | ν4 = 4.08 |
| R7 = 0.867 | D7 = 0.504 | | |
| R8 = –1.068 | D8 = 0.078 | N5 = 1.65844 | ν5 = 50.9 |
| R9 = 1.438 | D9 = 0.297 | N6 = 1.84666 | ν6 = 23.8 |
| R10 = –6.072 | D10 = Variable | | |
| R11 = (Stop) | D11 = 0.2191 | | |
| R12 = 2.765 | D12 = 0.579 | N7 = 1.58913 | ν7 = 61.2 |
| R13 = –4.644 | D13 = Variable | | |
| R14 = 7.115 | D14 = 0.093 | N8 = 1.84666 | ν8 = 23.8 |
| R15 = 1.908 | D15 = 0.657 | N9 = 1.48749 | ν9 = 70.2 |
| R16 = –3.431 | D16 = 0.023 | | |
| R17 = 3.301 | D17 = 0.359 | N10 = 1.48749 | ν10 = 70.2 |
| R18 = –6.719 | D18 = 0.782 | | |
| R19 = ∞ | D19 = 0.790 | N11 = 1.51633 | ν11 = 64.1 |
| R20 = ∞ | | | |

| Variable | Focal Length | | |
|---|---|---|---|
| Separation | 1.00 | 2.94 | 7.65 |
| D5 | 0.18 | 1.46 | 2.22 |
| D10 | 2.29 | 1.00 | 0.25 |
| D13 | 1.06 | 0.52 | 1.15 |

Aspheric Coefficients
R8  $K = -3.12812 \times 10^{-1}$    $B = -6.0187 \times 10^{-5}$
    $C = 6.80374 \times 10^{-7}$    $D = -6.64963 \times 10^{-7}$    $E = 0$
R12 $K = -5.66843 \times 10^{-2}$    $B = -1.09484 \times 10^{-4}$
    $C = 4.91832 \times 10^{-7}$    $D = -3.83754 \times 10^{-9}$    $E = 0$

Numerical Example 6:

| f = 1–7.6 | Fno. = 1:1.65–2.6 | 2ω = 6.9°–49° | |
|---|---|---|---|
| R1 = 5.426 | D1 = 0.142 | N1 = 1.80518 | ν1 = 25.4 |
| R2 = 2.610 | D2 = 0.657 | N2 = 1.60311 | ν2 = 60.7 |
| R3 = –29.433 | D3 = 0.021 | | |
| R4 = 2.307 | D4 = 0.485 | N3 = 1.63854 | ν3 = 55.4 |
| R5 = 7.080 | D5 = Variable | | |
| R6 = 3.366 | D6 = 0.071 | N4 = 1.88300 | ν4 = 40.8 |
| R7 = 0.786 | D7 = 0.387 | | |
| R8 = –0.932 | D8 = 0.071 | N5 = 1.63854 | ν5 = 55.4 |
| R9 = 1.293 | D9 = 0.271 | N6 = 1.84666 | ν6 = 23.8 |
| R10 = –7.541 | D10 = Variable | | |
| R11 = (Stop) | D11 = 0.200 | | |
| R12 = 2.096 | D12 = 0.614 | N7 = 1.51633 | ν7 = 64.1 |
| R13 = –3.235 | D13 = Variable | | |
| R14 = 4.270 | D14 = 0.085 | N8 = 1.84666 | ν8 = 23.8 |
| R15 = 1.546 | D15 = 0.500 | N9 = 1.48749 | ν9 = 70.2 |
| R16 = –3.407 | D16 = 0.021 | | |
| R17 = 4.588 | D17 = 0.257 | N10 = 1.48749 | ν10 = 70.2 |
| R18 = –9.046 | D18 = 0.714 | | |
| R19 = ∞ | D19 = 0.721 | N11 = 1.51633 | ν11 = 64.1 |
| R20 = ∞ | | | |

| Variable | Focal Length | | |
|---|---|---|---|
| Separation | 1.00 | 2.99 | 7.60 |
| D5 | 0.11 | 1.23 | 1.89 |
| D10 | 2.01 | 0.89 | 0.23 |
| D13 | 1.10 | 0.40 | 1.10 |

Aspheric Coefficients
R8  $K = -3.76999 \times 10^{-1}$    $B = -1.31339 \times 10^{-4}$
    $C = 7.38759 \times 10^{-6}$    $D = -1.35915 \times 10^{-6}$    $E = 0$
R12 $K = -7.84385 \times 10^{-1}$    $B = -1.22741 \times 10^{-4}$
    $C = 7.01371 \times 10^{-7}$    $D = -5.38178 \times 10^{-9}$    $E = 0$

Numerical Example 7:

| f = 1–9.45 | Fno. = 1:1.6–3.0 | 2ω = 52.4°–6.0° | |
|---|---|---|---|
| R1 = 8.2974 | D1 = 0.1538 | N1 = 1.80518 | ν1 = 25.4 |
| R2 = 3.5793 | D2 = 0.7538 | N2 = 1.51633 | ν2 = 64.1 |
| R3 = –9.9405 | D3 = 0.0308 | | |
| R4 = 2.8066 | D4 = 0.3385 | N3 = 1.74320 | ν3 = 49.3 |
| R5 = 5.0462 | D5 = Variable | | |
| R6 = 2.3885 | D6 = 0.0769 | N4 = 1.88300 | ν4 = 40.8 |
| R7 = 0.9753 | D7 = 0.5615 | | |
| R8 = –1.2635 | D8 = 0.0769 | N5 = 1.60311 | ν5 = 60.7 |
| R9 = 1.4569 | D9 = 0.3231 | N6 = 1.84666 | ν6 = 23.9 |
| R10 = 65.6260 | D10 = Variable | | |
| R11 = (Stop) | D11 = 0.22 | | |
| R12 = 2.8885 | D12 = 0.5077 | N7 = 1.58313 | ν7 = 59.4 |
| R13 = –5.4355 | D13 = Variable | | |
| R14 = 4.9507 | D14 = 0.1077 | N8 = 1.84666 | ν8 = 23.8 |
| R15 = 1.7484 | D15 = 0.5385 | N9 = 1.48749 | ν9 = 70.2 |
| R16 = –6.2998 | D16 = 0.0308 | | |
| R17 = 4.3446 | D17 = 0.3077 | N10 = 1.48749 | ν10 = 70.2 |
| R18 = –4.6929 | D18 = 0.7692 | | |
| R19 = ∞ | D19 = 0.7692 | N11 = 1.51633 | ν11 = 64.1 |
| R20 = ∞ | | | |

| Variable | Focal Length | | |
|---|---|---|---|
| Separation | 1.00 | 1.67 | 9.45 |
| D5 | 0.12 | 1.07 | 3.08 |
| D10 | 3.18 | 2.23 | 0.22 |
| D13 | 1.46 | 1.08 | 1.46 |

Aspheric Coefficients
R8  $K = -6.85483 \times 10^{-2}$    $B = 9.38752 \times 10^{-6}$
    $C = -2.49326 \times 10^{-7}$    $D = -1.75257 \times 10^{-7}$    $E = 0$
R12 $K = -1.28282 \times 10^{-1}$    $B = -6.50329 \times 10^{-5}$
    $C = 3.43622 \times 10^{-8}$    $D = -3.83175 \times 10^{-10}$    $E = 0$

Numerical Example 8:

| f = 1–7.6 | Fno. = 1:1.6–2.7 | 2ω = 52.4°–7.4° | |
|---|---|---|---|
| R1 = 6.8611 | D1 = 0.1692 | N1 = 1.80518 | ν1 = 25.4 |
| R2 = 3.2097 | D2 = 0.7692 | N2 = 1.51633 | ν2 = 64.1 |
| R3 = –11.0028 | D3 = 0.0308 | | |
| R4 = 2.5538 | D4 = 0.4308 | N3 = 1.62299 | ν3 = 58.1 |
| R5 = 7.3232 | D5 = Variable | | |
| R6 = 4.0056 | D6 = 0.1077 | N4 = 1.66672 | ν4 = 48.3 |
| R7 = 0.9276 | D7 = 0.5221 | | |
| R8 = –1.2549 | D8 = 0.1077 | N5 = 1.69680 | ν5 = 55.5 |
| R9 = 1.2472 | D9 = 0.3077 | N6 = 1.84666 | ν6 = 23.9 |
| R10 = 41.2629 | D10 = Variable | | |
| R11 = (Stop) | D11 = 0.18 | | |
| R12 = 6.8217 | D12 = 0.2923 | N7 = 1.58313 | ν7 = 59.4 |
| R13 = –4.5509 | D13 = 0.0231 | | |
| R14 = 2.3838 | D14 = 0.4154 | N8 = 1.51633 | ν8 = 64.1 |
| R15 = –5.3625 | D15 = 0.0665 | | |
| R16 = –3.1734 | D16 = 0.1077 | N9 = 1.80518 | ν9 = 25.4 |
| R17 = –9.9678 | D17 = Variable | | |
| R18 = 4.8954 | D18 = 0.1077 | N10 = 1.84666 | ν10 = 23.9 |
| R19 = 1.8346 | D19 = 0.0562 | | |
| R20 = 2.3837 | D20 = 0.3385 | N11 = 1.65844 | ν11 = 50.9 |
| R21 = –4.5052 | D21 = 0.0231 | | |
| R22 = 2.7343 | D22 = 0.2308 | N12 = 1.51633 | ν12 = 64.1 |
| R23 = 14.0812 | D23 = 0.7692 | | |

-continued

| R24 = ∞ | D24 = 0.9231 | N13 = 1.51633 | v13 = 64.1 |
| R25 = ∞ | | | |

| Variable | Focal Length | | |
| --- | --- | --- | --- |
| Separation | 1.00 | 2.82 | 7.60 |
| D5 | 0.14 | 1.42 | 2.27 |
| D10 | 2.35 | 1.07 | 0.22 |
| D17 | 0.92 | 0.35 | 0.92 |

Numerical Example 9:

| f = 1–9.45 | Fno. = 1:1.67–2.87 | 2ω = 52.4°–6.0° |
| --- | --- | --- |

| R1 = 10.9079 | D1 = 0.1538 | N1 = 1.80518 | v1 = 25.4 |
| R2 = 3.9954 | D2 = 0.6923 | N2 = 1.51633 | v2 = 64.1 |
| R3 = –8.9530 | D3 = 0.0308 | | |
| R4 = 3.0909 | D4 = 0.4154 | N3 = 1.74320 | v3 = 49.3 |
| R5 = 6.5289 | D5 = Variable | | |
| R6 = 2.6633 | D6 = 0.0769 | N4 = 1.88300 | v4 = 40.8 |
| R7 = 1.0506 | D7 = 0.5449 | | |
| R8 = –1.2539 | D8 = 0.0769 | N5 = 1.60311 | v5 = 60.7 |
| R9 = 1.5837 | D9 = 0.2769 | N6 = 1.84666 | v6 = 23.9 |
| R10 = 44.1727 | D10 = Variable | | |
| R11 = (Stop) | D11 = 0.18 | | |
| R12 = 2.5707 | D12 = 0.5385 | N7 = 1.58313 | v7 = 59.4 |
| R13 = –7.1394 | D13 = Variable | | |
| R14 = 3.9879 | D14 = 0.1077 | N8 = 1.84666 | v8 = 23.8 |
| R15 = 1.5878 | D15 = 0.5385 | N9 = 1.48749 | v9 = 70.2 |
| R16 = –6.0985 | D16 = 0.0231 | | |
| R17 = 3.9615 | D17 = 0.3077 | N10 = 1.48749 | v10 = 70.2 |
| R18 = –5.7702 | D18 = 0.7692 | | |
| R19 = ∞ | D19 = 0.7692 | N11 = 1.51633 | v11 = 64.1 |
| R20 = ∞ | | | |

| Variable | Focal Length | | |
| --- | --- | --- | --- |
| Separation | 1.00 | 1.67 | 9.45 |
| D5 | 0.13 | 1.08 | 3.09 |
| D10 | 3.18 | 2.23 | 0.22 |
| D13 | 1.54 | 1.16 | 1.54 |

Aspheric Coefficients
R12   K = –2.88376 × $10^{-1}$     B = –6.28811 × $10^{-5}$
      C = 3.41848 × $10^{-8}$      D = –2.68522 × $10^{-10}$

TABLE 1

| Condition | 5 | 6 | 7 | 8 | 9 |
| --- | --- | --- | --- | --- | --- |
| f3/f4 | 0.905 | 0.691 | 0.884 | 0.817 | 0.895 |
| \|f2\|/fw | 0.861 | 0.743 | 1.077 | 0.892 | 1.077 |

According to the invention, a zoom lens of the rear focus type having a large relative aperture of 1.4 in F-number is achieved by setting forth the rules for the refractive powers of the fourth lens units as stated before and employing the focusing lens configuration that moves the fourth lens unit. With these, the bulk and size of the entire lens system are minimized in such a manner that, despite the extension of the zooming range to more than 8, good stability of aberration correction is maintained throughout the entire zooming range and at the same time the variation of aberrations with focusing is minimized.

What is claimed is:

1. A zoom lens of the rear focus type comprising, in order from an object side to an image side:

a first lens unit of positive refractive power;

a second lens unit of negative refractive power;

a third lens unit of positive refractive power; and a fourth lens unit of positive refractive power, said second lens unit and said fourth lens unit axially moving to effect zooming, and said fourth lens unit axially moving to effect focusing, wherein said third lens unit includes at least one positive lens at a front position and a negative lens of meniscus form concave toward the image side at the rearmost position, and said fourth lens unit includes one negative lens and two positive lenses, and wherein the following condition is satisfied:

$$0.73 < f3/f4 < 1.00$$

where f3 and f4 are the focal lengths of said third lens unit and said fourth lens unit, respectively.

2. A zoom lens of the rear focus type according to claim 1, wherein said second lens unit comprises three independent lenses including, in order from the object side;

a negative first lens of meniscus form convex toward the object side;

a negative second lens whose both surfaces are concave; and a positive third lens having a convex surface of stronger refracting power facing the object side than that of a surface facing the image side.

\* \* \* \* \*

UNITED STATES PATENT AND TRADEMARK OFFICE
CERTIFICATE OF CORRECTION

PATENT NO. : 5,612,825
DATED : March 18, 1997
INVENTOR(S) : AKIHISA HORIUCHI, ET AL.

It is certified that error appears in the above-indentified patent and that said Letters Patent is hereby corrected as shown below:

COLUMN 9

Line 32, "16(B)(1) through 18(B)(3)," should read --16(B)(1) through 16(B)(3),--.

COLUMN 14

Line 39, "side;" should read --side:--.

Signed and Sealed this

Ninth Day of September, 1997

Attest:

BRUCE LEHMAN

Attesting Officer    Commissioner of Patents and Trademarks